(12) United States Patent
Karthikeyan et al.

(10) Patent No.: US 11,616,728 B2
(45) Date of Patent: Mar. 28, 2023

(54) MODIFYING QUALITY OF SERVICE TREATMENT FOR DATA FLOWS

(71) Applicant: BRITISH TELECOMMUNICATIONS PUBLIC LIMITED COMPANY, London (GB)

(72) Inventors: Vidhyalakshmi Karthikeyan, London (GB); Detlef Nauck, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 15/740,835

(22) PCT Filed: Jun. 30, 2016

(86) PCT No.: PCT/EP2016/065420
§ 371 (c)(1),
(2) Date: Dec. 29, 2017

(87) PCT Pub. No.: WO2017/001621
PCT Pub. Date: Jan. 5, 2017

(65) Prior Publication Data
US 2018/0191622 A1    Jul. 5, 2018

(30) Foreign Application Priority Data

Jun. 30, 2015  (EP) ..................................... 15275166
Sep. 28, 2015  (EP) ..................................... 15187163
(Continued)

(51) Int. Cl.
*H04L 47/24*      (2022.01)
*H04L 47/76*      (2022.01)
(Continued)

(52) U.S. Cl.
CPC ...... *H04L 47/2458* (2013.01); *H04L 41/5006* (2013.01); *H04L 41/5009* (2013.01);
(Continued)

(58) Field of Classification Search
CPC .................................................... H04L 41/5009
See application file for complete search history.

(56) References Cited

U.S. PATENT DOCUMENTS 6,631,122 B1   10/2003   Arunachalam et al.
6,631,135 B1   10/2003   Wojcik
(Continued)

FOREIGN PATENT DOCUMENTS

EP    1 248 431       10/2002
EP    1 016 261       1/2004
(Continued)

OTHER PUBLICATIONS

International Search Report for PCT/EP2016/065420, dated Sep. 15, 2016, 3 pages.
(Continued)

*Primary Examiner* — Kevin M Cunningham
(74) *Attorney, Agent, or Firm* — Nixon & Vanderhye P.C.

(57) ABSTRACT

Modifying quality of service treatment for data flows A method of transmitting a data flow via a network is disclosed where the network supports transmission of data in accordance with a plurality of Quality of Service, QoS, models. Prior to transmission of the data flow, a client system configures a first class of service for the data flow based on a first QoS model, and a first portion of the data flow is transmitted through the network in accordance with the first class of service. In response to detecting a renegotiation condition, the network communicates with the client system to configure a second class of service for the data flow based on a second QoS model, and a subsequent portion of the data
(Continued)

flow is transmitted through the network using the second class of service.

11 Claims, 7 Drawing Sheets

(30) Foreign Application Priority Data

Sep. 30, 2015 (EP) .................................. 15187813
Mar. 24, 2016 (EP) .................................. 16162448

(51) Int. Cl.
*H04L 47/80* (2022.01)
*H04L 41/5009* (2022.01)
*H04L 41/5022* (2022.01)
*H04L 41/5006* (2022.01)
*H04L 47/2425* (2022.01)
*H04L 47/70* (2022.01)

(52) U.S. Cl.
CPC .......... *H04L 41/5022* (2013.01); *H04L 47/24* (2013.01); *H04L 47/2425* (2013.01); *H04L 47/76* (2013.01); *H04L 47/805* (2013.01); *H04L 47/823* (2013.01)

(56) References Cited

U.S. PATENT DOCUMENTS

| | | | |
|---|---|---|---|
| 6,690,929 B1 | 2/2004 | Yeh | |
| 7,072,961 B1* | 7/2006 | Maclean | H04L 43/087 709/224 |
| 7,668,946 B1 | 2/2010 | Garcia-Franco et al. | |
| 7,715,312 B2 | 5/2010 | Khasnabish | |
| 8,073,455 B1 | 12/2011 | Xie et al. | |
| 8,797,867 B1* | 8/2014 | Chen | H04L 41/5022 370/232 |
| 2001/0013067 A1 | 8/2001 | Koyanagi et al. | |
| 2002/0174227 A1 | 11/2002 | Hartsell | |
| 2003/0112762 A1 | 6/2003 | Hasan Mahmoud et al. | |
| 2003/0144822 A1 | 7/2003 | Peh | |
| 2004/0120705 A1 | 6/2004 | Friskney et al. | |
| 2004/0230678 A1 | 11/2004 | Huslak et al. | |
| 2005/0083762 A1 | 4/2005 | Rui et al. | |
| 2005/0083849 A1 | 4/2005 | Rui et al. | |
| 2005/0102414 A1 | 5/2005 | Hares et al. | |
| 2005/0250509 A1* | 11/2005 | Choksi | H04L 47/6215 455/452.1 |
| 2006/0039380 A1 | 2/2006 | Cloonan | |
| 2006/0045057 A1* | 3/2006 | Nylander | H04L 29/06027 370/338 |
| 2006/0133346 A1* | 6/2006 | Chheda | H04L 47/11 370/352 |
| 2006/0187817 A1 | 8/2006 | Charzinski et al. | |
| 2006/0211441 A1* | 9/2006 | Mese | H04W 52/243 455/522 |
| 2006/0265499 A1* | 11/2006 | Menasce | G06Q 10/06 709/225 |
| 2007/0036078 A1 | 2/2007 | Chowdhury et al. | |
| 2007/0058561 A1* | 3/2007 | Virgile | H04L 12/14 370/252 |
| 2007/0230363 A1 | 10/2007 | Buskens et al. | |
| 2007/0263653 A1 | 11/2007 | Hassan et al. | |
| 2007/0268827 A1 | 11/2007 | Csaszar | |
| 2008/0008091 A1 | 1/2008 | Yumoto | |
| 2008/0065318 A1 | 3/2008 | Ho | |
| 2008/0104251 A1 | 5/2008 | Xu | |
| 2008/0232247 A1 | 9/2008 | Evans | |
| 2009/0191858 A1 | 7/2009 | Calisti | |
| 2009/0245130 A1 | 10/2009 | Bing | |
| 2010/0100525 A1 | 4/2010 | Huang | |
| 2010/0214920 A1 | 8/2010 | Tewani et al. | |
| 2010/0246394 A1* | 9/2010 | Omar | H04W 36/385 370/230.1 |
| 2010/0265826 A1 | 10/2010 | Khasnabish | |
| 2011/0087522 A1 | 4/2011 | Beaty et al. | |
| 2013/0144550 A1 | 6/2013 | Czompo | |
| 2013/0275567 A1 | 10/2013 | Karthikeyan et al. | |
| 2013/0275589 A1 | 10/2013 | Karthikeyan et al. | |
| 2013/0279521 A1 | 10/2013 | Pérez Martinez et al. | |
| 2013/0311673 A1 | 11/2013 | Karthikeyan | |
| 2014/0046880 A1 | 2/2014 | Breckenridge | |
| 2014/0052850 A1 | 2/2014 | Doorhy et al. | |
| 2014/0057592 A1 | 2/2014 | Chetlur et al. | |
| 2014/0140213 A1* | 5/2014 | Raleigh | H04L 67/2804 370/235 |
| 2015/0071076 A1* | 3/2015 | Izhak-Ratzin | H04L 47/805 370/236 |
| 2015/0074283 A1 | 3/2015 | Karthikeyan et al. | |
| 2015/0098338 A1 | 5/2015 | Bhattacharya | |
| 2015/0332155 A1 | 11/2015 | Mermoud | |
| 2015/0381648 A1 | 12/2015 | Mathis | |
| 2016/0171398 A1 | 6/2016 | Eder | |
| 2016/0344604 A1 | 11/2016 | Raleigh | |
| 2018/0191606 A1 | 7/2018 | Karthikeyan | |
| 2018/0191621 A1 | 7/2018 | Karthikeyan | |
| 2018/0191635 A1 | 7/2018 | Karthikeyan | |

FOREIGN PATENT DOCUMENTS

| | | |
|---|---|---|
| EP | 1401 161 | 3/2004 |
| EP | 1 453 256 | 8/2005 |
| EP | 1 858 210 | 11/2007 |
| EP | 1 993 231 | 11/2008 |
| EP | 2 151951 | 2/2010 |
| EP | 2 261 811 | 12/2010 |
| EP | 2 469 756 | 6/2012 |
| EP | 1 875 693 | 8/2012 |
| EP | 1 374 486 | 2/2022 |
| GB | 2 324 436 | 10/1998 |
| WO | 99/14931 | 3/1999 |
| WO | 02/080458 | 7/2000 |
| WO | 01/65779 | 9/2001 |
| WO | 2006/116308 | 11/2006 |
| WO | WO 2011/011931 | 1/2007 |
| WO | 2007/082918 | 7/2007 |
| WO | WO 2007/082918 | 7/2007 |
| WO | WO 2008/102311 | 8/2008 |
| WO | 2011/076282 | 6/2011 |
| WO | 2012/085520 | 6/2012 |
| WO | 2012/085521 | 6/2012 |
| WO | 2013/059683 | 4/2013 |
| WO | 2013/144550 | 10/2013 |
| WO | 2014/068268 | 5/2014 |
| WO | 2014/068270 | 5/2014 |
| WO | 2017/001628 | 1/2017 |
| WO | 2017/001629 | 1/2017 |

OTHER PUBLICATIONS

Search Report dated Oct. 31, 2016, issued in GB 1605199.7 (6 pages).
Search Report and Written Opinion issued in PCT/EP2016/065420 dated Sep. 15, 2016 (14 pages).
Mammeri, "Chapter 2: Principles and Mechanisms for Quality of Service in Networks" in End-to-End Quality of Service Mechanisms in Next Generation Heterogeneous Networks, Jan. 31, 2010, Wiley-ISTE, XP055300371 (33 pages).
Office Action dated Nov. 13, 2019 issued in U.S. Appl. No. 15/740,832 (12 pages).
Office Action dated Nov. 13, 2019 issued in U.S. Appl. No. 15/740,837 (11 pages).
Advisory Action dated Oct. 8, 2019, issued in U.S. Appl. No. 15/740,520 (3 pages).
Advisory Action dated Aug. 2, 2019 issued in U.S. Appl. No. 15/740,837 (4 pgs.).
Advisory Action dated Aug. 2, 2019 issued in U.S. Appl. No. 15/740,832 (4 pgs.).
Balaraman, "Business Data Mining and Decision Making Application of Data Mining in the Telecommunication Industry" Term

(56) References Cited

OTHER PUBLICATIONS paper, Quantitative Methods & Information Systems, Indian Institute of Management Bangalore, Oct. 22, 2011 (23 pages).
European Office Action dated May 20, 2019, issued in EP No. 16 733 095.0 (9 pages).
Extended European Search Report dated Nov. 26, 2015 issued in European Application No. 15275166.5 (5 pgs.).
GB Search Report issued in GB 1517349.5, dated May 26, 2016 (6 pages).
International Search Report and Written Opinion issued in PCT/EP2016/065434 dated Oct. 6, 2016 (15 pages).
International Search Report and Written Opinion of the International Searching Authority dated Sep. 6, 2016 issued in International Application No. PCT/EP2016/065436 (13 pgs.).
International Search Report and Written Opinion of the International Searching Authority dated Sep. 5, 2016 issued in International Application No. PCT/EP2016/065429 (16 pgs.).
International Search Report and Written Opinion of the International Searching Authority dated Sep. 23, 2016, issued in International Application No. PCT/EP2016/065431 (13 pages).
International Search Report of PCT/EP2016/065431, dated Sep. 23, 2016, 3 pages.
Jari Koistinen and Aparna Seetharaman, "Worth-Based Multi-Category Quality-of-Service Negotiation in Distributed Object Infrastructures", Hewlett-Packard Laboratories, Jul. 1998 (11 pgs.).
Krishna Kumar Balaraman, "Application of Data Mining in the Telecommunication Industry", Term Paper, Indian Institute of Management Bangalore, Oct. 22, 2011 (23 pgs.).
Office Action dated Apr. 19, 2019 issued in U.S. Appl. No. 15/740,837 (14 pgs.).
Office Action dated Apr. 19, 2019 issued in U.S. Appl. No. 15/740,832 (12 pgs.).
Office Action dated May 23, 2019, issued in EP Application No. 16 734 360.7 (9 pgs.).
Office Action dated May 30, 2019 issued in U.S. Appl. No. 15/740,520 (16 pgs.).
Office Action dated Nov. 2, 2018 issued in U.S. Appl. No. 15/740,520 (13 pgs.).
Office Action dated Oct. 17, 2018 issued in U.S. Appl. No. 15/740,837 (11 pgs.).
Office Action dated Oct. 17, 2018 issued in U.S. Appl. No. 15/740,832 (11 pgs.).
Search Report dated Apr. 27, 2016 issued in GB1517110.1 (7 pages).
Tanja Zseby and Sebastian Zander, "Sampling Schemes for Validating Service Level Agreements", Centre for Advanced Internet Architectures, CAIA Technical Report 040706A, Jul. 2004 (6 pgs.).
U.S. Appl. No. 15/740,520, filed Dec. 28, 2017 (30 pgs.).
U.S. Appl. No. 15/740,832, filed Dec. 29, 2017 (29 pgs.).
U.S. Appl. No. 15/740,837, filed Dec. 29, 2017 (33 pgs.).
Valikannu "A Novel Energy Consumption Model using Residual Energy Based Mobile Agent Selection Scheme (REMA) in MANETs" 2015 $2^{nd}$ International Conference on Signal Processing and Integrated Networks (SPIN), Noida, India. Pub., IEEE, Feb. 19-20, 2015 (6 pages).
Zhengdong Gao and Gengfeng Wu, "Combining QoS-based Service Selection with Performance Prediction", School of Computer Engineering and Science, Shanghai University, Proceedings of the 2005 IEEE International Conference on e-Business Engineering (ICEBE'05); 2005 (4 pgs.).
International Search Report of PCT/EP2016/065429, dated Sep. 5, 2016, 4 pages.
Examination Report issued in EP Application No. 16 733 597.5 dated Sep. 12, 2019 (9 pages).
Ananya DAS "Maximizing Profit Using SLA-Aware Provisioning", 2012 IEEE Network Operations and Management Symposium (NOMS), Math & Computer Science Department, Lake Forest College, Apr. 16, 2012 (8 pages).
Office Action dated Mar. 4, 2020 issued in U.S. Appl. No. 15/740,520 (19 pgs.).
European Exam Report dated Oct. 13, 2021 issued in European Application No. 16 733 597_5 (8 pages).
Communication pursuant to Article 94(3) EPC dated Feb. 17, 2021 issued in European Application No. 16 734 360.7 (8 pages).
Communication pursuant to Article 94(3) EPC dated Jan. 3, 2023 issued for European Application No. 16 734 360.7 (8 pages).

\* cited by examiner

| Prototype Vector | Jitter | Loss | Delay |
|---|---|---|---|
| $p_1$ | 3.01 | 0.1506 | 24.82 |
| $p_2$ | 4.00 | 0.1003 | 29.76 |
| $p_3$ | 2.50 | 0.1995 | 19.90 |

Fig. 2A

| Confidence Vector | Jitter | Loss | Delay |
|---|---|---|---|
| $c_1$ | 0.0280 | 0.0015 | 0.2193 |
| $c_2$ | 0.0395 | 0.0008 | 0.2235 |
| $c_3$ | 0.0211 | 0.0017 | 0.1905 |

Fig. 2B

| | Base Data | | | | Global Statistics | | | | |
|---|---|---|---|---|---|---|---|---|---|
| ID | Prototype | Global Confidence | Created | Capacity [Mb/s] | Routes | Peak Flows | Peak Demand [Mb/s] | 1hr Flows | ... |
| 1 | (3.1, 0.1521, 25.15) | (0.0280, 0.0015, 0.2193) | 20/03/2014 12:00 | 200 | 3 | 24 | 153 | 13 | ... |
| 2 | (4.00, 0.1003, 29.76) | (0.0395, 0.0008, 0.2235) | 20/03/2014 14:00 | 150 | 3 | 0 | 0 | 0 | ... |
| 3 | (2.50, 0.1995, 19.90) | (0.0211, 0.0017, 0.1905) | 20/03/2014 14:00 | 300 | 3 | 0 | 0 | 0 | ... |
| ... | ... | ... | ... | | ... | ... | ... | ... | ... |

Fig. 2C

| | Base Data | | | | Route-based Statistics | | |
|---|---|---|---|---|---|---|---|
| Route | Model ID | Route Confidence | Active since | Capacity [Mb/s] | Peak Flows | Peak Demand [Mb/s] | ... |
| 1 | 1 | (0.0280, 0.0015, 0.2193) | 20/03/2014 12:00 | 100 | 8 | 82 | |
| 2 | 1 | (0.0280, 0.0015, 0.2193) | 20/03/2014 12:00 | 50 | 9 | 48 | |
| 3 | 1 | (0.0280, 0.0015, 0.2193) | 20/03/2014 12:00 | 50 | 7 | 23 | |
| 4 | 2 | (0.0395, 0.0008, 0.2235) | 20/03/2014 14:00 | 200 | 0 | 0 | ... |
| ... | ... | ... | ... | | ... | ... | ... |
| 9 | 3 | (0.0211, 0.0017, 0.1905) | 20/03/2014 14:00 | 100 | 0 | 0 | ... |
| ... | ... | ... | ... | | ... | ... | ... |

Fig. 2D

| Request ID | Jitter | Loss | Delay | Resilience | Energy | Load distribution | Source | Destination |
|---|---|---|---|---|---|---|---|---|
| 1 | J1 | L1 | D1 | ✓ | ✓ | ✗ | C1 | C2 |
| 2 | ✗ | L2 – L3 | ✗ | ✗ | ✗ | ✓ | C3 | C4 |
| 3 | ✓ | ✓ | D2 – D3 | ✓ | ✗ | ✗ | C1 | C4 |

| Time | QoS_D to renegotiate | Conditions |
|---|---|---|
| 08:00 | {J1, L1, D1, R1} | Traffic profile: A, Destination: D1 |
| 17:00 | {L2, D2, R2, C1, E1} | Traffic profile: B, Destinations: D1, D2, D3 |
| 22:00 | {E2} | Destinations: All |
| All | {J1, L1, D1, R1} | Traffic profile: C, Destination: All |

MODIFYING QUALITY OF SERVICE TREATMENT FOR DATA FLOWS

This application is the U.S. national phase of International Application No. PCT/EP2016/65420 filed 30 Jun. 2016, which designated the U.S. and claims priority to EP Patent Application No. 15275166.5 filed 30 Jun. 2015, EP Patent Application No. 15187163.9 filed 28 Sep. 2015, EP Patent Application No. 15187813.9 filed 30 Sep. 2015, and EP Patent Application No. 16162448.1 filed 24 Mar. 2016, the entire contents of each of which an hereby incorporated by reference.

BACKGROUND AND SUMMARY

The present invention relates to transmission of data flows over computer networks with agreed Quality of Service (QoS) characteristics.

As the volume of traffic transmitted on packet switched networks has increased, and the types of traffic transmitted over such networks has broadened to include traffic types that rely upon low latency transmission over the network, such as voice or streaming media, it has become increasingly important to enable proactive management of the traffic on the network.

Various approaches have been developed to enable differentiated handling of different types of network traffic. The Integrated Services, IntServ, architecture is designed to guarantee a particular quality of service for the transmission of a stream of packets across a network. Prior to transmission of a stream of packets, IntServ requires that an originating network component reserves resources in each router through which the stream of packets will pass. This resource reservation, usually requested using RSVP (Resource Reservation Protocol), ensures that each router in the path has the necessary resources to guarantee transmission of the packet stream at a particular QoS prior to transmission of the packet stream. However, the IntServ system does not scale easily, since it quickly becomes difficult for the network components to manage the reservations.

An alternative approach is the Differentiated Services, DiffServ, architecture, which enables the network to classify the traffic into one of a specified and predetermined (and usually quite small) number of traffic classes. A differentiated services, DS, field is populated in each packet transmitted across the network and the field indicates to the network the quality of service, QoS, that is to be provided to that packet in its transmission between network components. The DiffServ model can be used to provide low-latency transmission of critical network traffic, such as streaming packets or voice-over-IP packets, across a network. Packets not marked with a prioritised packet code, such as email and web traffic, can be transmitted when the network components have capacity to do so (so-called "best-effort" traffic). However, the limitation to a small set of predefined classes of service generally limits flexibility for network clients transmitting data flows over the network, and also means that available network resources may not always be utilised efficiently. Furthermore, these prior art approaches often do not cope well with changing network conditions and traffic requirements.

In a first aspect of the invention, there is provided a method of transmitting a data flow via a network, the network supporting transmission of data in accordance with a plurality of Quality of Service, QoS, models, the method comprising: prior to transmission of the data flow, communicating with a client system associated with the data flow to configure a first class of service for the data flow based on a first QoS model; transmitting a first portion of the data flow through the network in accordance with the first class of service; detecting a renegotiation condition; and in response to detecting the renegotiation condition: communicating with the client system to configure a second class of service for the data flow based on a second QoS model; and transmitting a subsequent portion of the data flow through the network in accordance with the second class of service.

QoS models generally define classes of service available in the network. Such classes of service may be considered "available" (for example) in the sense that they have been preconfigured (e.g. by the network operator) or have been determined to be supportable by available network resources based on measurement of network performance. Preferably, each QoS model specifies a set of one or more QoS features defining data flow characteristics associated with the model. QoS features (or data flow characteristics) may concern any measurable, quantifiable or classifiable characteristic relating to the transmission of data in the network, including measures of data transmission performance, measures relating to cost or energy consumption, and the like.

When reference is made herein to a QoS model "meeting", "supporting" or being "compliant" with a requirement (or similar language), this may be taken to mean that the QoS model defines a performance level for a given feature that meets or exceeds a performance level specified by a corresponding QoS requirement. This may for example be determined by numerical comparison of feature metrics, though the specifics may depend on the numerical or other data representation of the given feature metric. A similar interpretation applies where reference is made to a route "complying" with or "supporting" a QoS model or QoS model feature, or similar language.

QoS requirements specified by a client during negotiation (or renegotiation) of a class of service and/or QoS features specified in the QoS models preferably include one or more QoS metrics, the QoS metrics preferably comprising one or more of: packet delay; packet loss; packet jitter; cost associated with data transmission; energy consumption associated with data transmission; and failure resilience of a network route or portion via which a data flow is transmitted. Any other appropriate performance metrics or other metrics may be used.

Thus, in accordance with the invention, the class of service applied to a data flow may be changed during the lifetime of the data flow, by way of a renegotiation exchange between client system and network (e.g. a gatekeeper entity of the network). The renegotiation is triggered by a renegotiation condition—when the renegotiation condition (or one of multiple such conditions that may be configured) is determined to be met, then renegotiation is triggered. A data flow may also be considered a "session", where class of service for the session is negotiated at the time of admission of the session and then renegotiated during the session.

Preferably, communicating to configure a second class of service comprises: transmitting a renegotiation notification to the client; and receiving a response from the client, the response indicating the second QoS model for the data flow.

The method may comprise transmitting information specifying one or more alternative QoS models for the data flow, the second QoS model preferably selected from, or based on at least one of, the alternative QoS models. Information specifying the one or more alternative QoS models may be included in the renegotiation notification or may be sent in response to a query from the client system.

Configuring the first class of service preferably comprises an initial QoS negotiation with the client system based on one or more QoS characteristics requested by the client, the method comprising selecting the alternative QoS model(s) based on the QoS characteristics requested during the initial QoS negotiation (e.g. in an initial query or reservation message from the client).

The method may further comprise determining one or more performance characteristics of the data flow, wherein the renegotiation condition is detected in dependence on the performance characteristics. Determining performance characteristics of the data flow may comprise one or both of: measuring one or more past performance characteristics of the data flow; and forecasting one or more future performance characteristics for the data flow. The method may comprise: determining one or more reference performance characteristics; comparing performance characteristics of the data flow to the reference performance characteristics; and determining that the renegotiation condition is met in dependence on the comparison.

The method may comprising determining that the renegotiation condition is met if the performance characteristics of the data flow differ from the reference performance characteristics, preferably by more than a threshold amount/difference; or wherein the reference performance characteristics specify a range of acceptable performance, the method comprising determining that the renegotiating condition is met if the performance characteristics of the data flow indicate a performance outside the range.

The reference performance characteristics and the performance characteristics of the data flow may each comprise a vector of one or more performance metrics, the comparing step comprising computing a vector distance or difference between the respective vectors, and preferably determining that the renegotiation condition is met if the vector distance or difference exceeds a threshold.

The reference performance characteristics may be determined based on the first class of service assigned to the data flow. The first class of service may be configured based on a negotiation exchange with the client system, the negotiation exchange comprising at least an initial request from the client system specifying an initially requested quality of service, and a reservation request from the client system specifying a reserved quality of service to be provided to the data flow; the reference performance characteristics may then be based on the initially requested quality of service and/or the reserved quality of service.

The method may comprise selecting one or more reference data flows; and determining reference performance characteristics may comprise determining characteristics representative of performance of the reference data flows. The reference performance characteristics preferably comprise or are based on aggregate performance characteristics of the reference data flows. The reference data flows are preferably selected based on a similarity metric indicating a similarity between a reference data flow and the client data flow.

Selecting one or more reference data flows may comprise: determining vectors of performance metrics for a plurality of reference data flows; clustering the performance vectors into a plurality of clusters; identifying a closest cluster to a performance vector representing performance characteristics of the data flow; and selecting the one or more reference data flows based on the identified cluster. The method may further comprise determining an aggregate performance vector for the identified cluster; wherein the reference performance characteristics are based on the aggregate performance vector.

Preferably, reference data flows comprise one or both of: one or more past or terminated data flows; one or more current or in-progress data flows.

Alternatively or additionally, the renegotiation condition may relate to a change in an available set of QoS models supported by the network, the change preferably having occurred after configuration of the first class of service. The method may comprise determining that the renegotiation condition is met in response to detecting addition or removal of (or change to) one or more QoS models to/from the available set. Detecting the renegotiation condition may comprises determining that the first QoS model has been removed from the available set; the method preferably further comprising offering one or more alternative QoS models to the client system for the data flow from the QoS models in the available set.

Preferably, detecting the renegotiation condition comprises identifying one or more QoS models in the available set that provide a quality of service which is better than that provided by the first QoS model and/or that more closely match a quality of service requested by the client system during configuration of the first class of service than the first QoS model; the method preferably further comprising offering one or more of the identified QoS models to the client system as alternative QoS models for the data flow.

The method may comprise determining that an alternative QoS model is to be offered if the alternative QoS model meets one or more requirements specified by the client during an initial negotiation when configuring the first class of service. Detecting the renegotiation condition may comprise identifying one or more QoS models in the available set that provide a quality of service which is at least as good as the first QoS model, preferably for each QoS feature of the first QoS model, and which specify at least one additional QoS feature not specified in the first QoS model.

In the various steps discussed above, relative quality of QoS (models) may be determined with respect to at least one and preferably each of a set of QoS features specified by, or common to, QoS models being compared; and/or by numerical comparison of one or more QoS metrics or distance computation between respective QoS feature vectors. References to a particular QoS being as good as, better than or not as good as another QoS can be interpreted accordingly.

The method may comprise: determining a requested QoS vector, wherein the requested QoS vector comprises a set of QoS metrics based on QoS requirements specified by the client system when configuring the first class of service; determining a delivered QoS vector, wherein the delivered QoS vector comprises a set of QoS metrics based on the first QoS model and/or a based on a measured or forecast performance of the data flow; determining a plurality of available QoS vectors for a set of available QoS models; computing a first difference measure between the requested QoS vector and the delivered QoS vector; computing respective second difference measures between the requested QoS vector and each of the available QoS vectors; and identifying one or more available QoS models in the set of available QoS models having QoS vectors closer to the requested QoS vector than the delivered QoS vector in accordance with the computed difference measures. The method may further comprise, in response to identifying one or more available QoS models, detecting the renegotiation condition and/or offering one or more of the identified available QoS models to the client for the data flow.

The above method is preferably performed at a negotiation module associated with the network (e.g. a gatekeeper entity as described further below) but equivalent functionality may be implemented at a client system.

In a further aspect of the invention, there is provided a method of configuring a class of service applied to a data flow transmitted from a client system via a network, the network supporting transmission of data in accordance with a plurality of Quality of Service, QoS, models, the method comprising, at the client system: prior to transmission of the data flow, communicating with a QoS negotiation module associated with the network to configure a first class of service for the data flow based on a first QoS model; initiating transmission of the data flow to the network based on the first class of service; detecting a renegotiation condition; and in response to detecting the renegotiation condition: communicating with the QoS negotiation module to configure a second class of service for the data flow based on a second QoS model; and continuing transmission of the data flow to the network based on the second class of service.

Detecting the renegotiation condition may comprise: determining one or more current performance requirements for the data flow; determining one or more performance characteristics of the data flow; and detecting the renegotiation condition if the determined performance characteristics differ from the current performance requirements, preferably by more than a threshold difference. The method may comprise detecting the renegotiation condition if the performance characteristics of the data flow exceed (or alternatively fall below) the current performance requirements. Preferably, determining performance characteristics of the data flow may comprise one or both of: measuring one or more past performance characteristics for the data flow; and forecasting one or more future performance characteristics for the data flow.

The method may comprise, in response to detecting the renegotiation condition, configuring the second class of service based on a QoS model having a performance level closer to the current required performance level and/or based on a lower cost QoS model. For example, the client is able to trigger QoS renegotiation if the current delivered level of service exceeds the required service and thereby reduce costs and/or excessive resource consumption.

As described previously, QoS/performance may be compared or assessed with respect to at least one and preferably each of a set of performance features; and/or by numerical comparison of one or more QoS metrics or distance computation between respective QoS feature vectors.

The method may comprise detecting the renegotiation condition based on a change in one or more traffic characteristics of traffic carried as part of the data flow, preferably wherein traffic characteristics include one or more of: traffic type; traffic volume or bandwidth; traffic performance requirements. The change may be a past or current change, or a predicted/expected change.

The method may comprise accessing a stored set of renegotiation rules, each rule specifying a renegotiation condition, wherein the method comprises communicating with the QoS negotiation module to configure a second class of service in response to detecting a renegotiation condition specified in a stored renegotiation rule.

A rule (or each rule) may specify one or more rule conditions, the method comprises triggering class of service renegotiation in accordance with the rule if each of the rule conditions for the rule are met, the rule conditions preferably including one or more of: a time at which renegotiation is to be triggered in accordance with a rule; traffic profile information indicating a type of traffic to which the rule applies; one or more traffic destinations to which the rule applies. For example, for each of a plurality of rules, renegotiation may be triggered at a time specified in the rule for traffic matching a particular profile and/or destination.

A rule may further specify one or more required QoS characteristics, the method comprising, in response to triggering renegotiation based on a rule, communicating with the negotiation module to negotiate a class of service for the data flow based on the QoS characteristics specified in the rule. Thus, rules may specify not only the condition(s) under which renegotiation is to be triggered, but also the QoS that is to be requested for a data flow when the renegotiation condition(s) are met.

Note that any of the features of client-triggered renegotiation set out in relation to this aspect of the invention may be applied to network-initiated renegotiation as per the first aspect of the invention, and vice versa.

In either aspect, the renegotiation criterion may additionally or alternatively comprises a time-based criterion. For example, the method may comprise determining that the renegotiation criterion is met based on: a predetermined time period having elapsed since an initial negotiation or a most recent renegotiation of the class of service for the data flow; and/or a current time reaching or passing one or more predefined time points at which renegotiation is to be performed. Thus, renegotiation may be initiated at predefined times and/or periodically at predetermined intervals.

In either aspect, the method may comprise tagging traffic of the data flow with a class of service identifier corresponding to the first and/or second configured class of service. Traffic of the data flow may then be transmitted/routed in the network based on the tagged class of service identifier.

In a further aspect, the invention provides a tangible computer readable medium comprising software code adapted, when executed on a data processing apparatus, to perform any method as set out herein.

The system further provides a system, computer/network device, or apparatus having means, preferably in the form of at least one processor and associated memory, for performing any method as set out herein.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus and computer program aspects, and vice versa.

Furthermore, features implemented in hardware may generally be implemented in software, and vice versa. Any reference to software and hardware features herein should be construed accordingly.

BRIEF DESCRIPTION OF THE DRAWINGS

Preferred features of the present invention will now be described, purely by way of example, with reference to the accompanying drawings, in which:

FIGS. 2A and 2B give examples of QoS feature vectors and confidence vectors that may be used to define QoS models;

FIGS. 2C and 2D give examples of tables comprising QoS model information and model-to-route mapping information;

DETAILED DESCRIPTION OF EXAMPLE EMBODIMENTS OF THE INVENTION

Overview

Embodiments of the invention provide systems and methods for renegotiating the class of service that is applied to a data flow being carried across a network. The class of service may be expressed in terms of one or more quality of service (QoS) models that are defined for the network. The class of service may be changed in response to a variety of triggers, such as performance considerations, changes in available QoS models, and the like.

Figure 1:
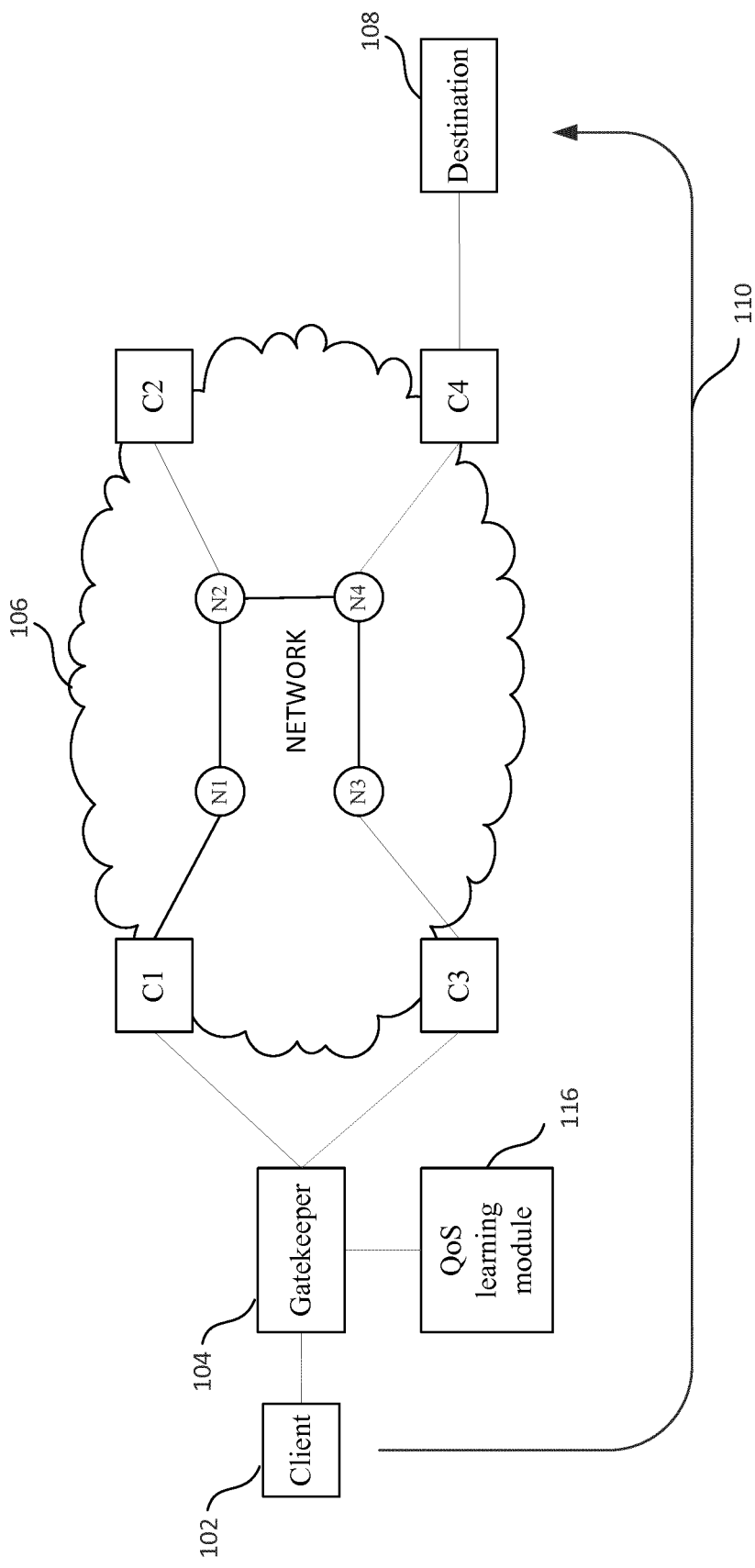
FIG. 1 illustrates a system for transmission of data flows across a network based on negotiated quality of service (QoS) metrics.

FIG. 1 illustrates a typical scenario in which a data flow 110 is being transmitted from a client 102 to a given destination 108. Note that the terms "client" and "destination" are used merely to refer to the originator and recipient of the data flow respectively, such that the client is in the role of acquiring and consuming network resources from the network, and do not imply a client/server type relationship. In this context, a client can be any device or system requiring transmission of data over the network, for example, a single end device, a corporate customer's private network, a peering autonomous system or an intermediate content provider/carrier themselves. For example, the client could be a media streaming system and the destination could be a user device such as a media player.

The data flow is being transmitted across a network 106, which includes a number of interconnected edge nodes C1-C4 and internal nodes N1-N4 (the number of nodes and interconnections depicted are chosen purely for example purposes). The network can thus provide various routes between pairs of edge devices, which can carry data flows, such as C1-N1-N2-C2, C1-N1-N2-N4-C4 etc. Each of these routes may have different performance characteristics, for example in terms of packet loss or delay, and these performance characteristics can vary during the lifetime of the data flow.

The network is configured to provide data transmission in accordance with various distinct Quality of Service (QoS) models. Each QoS model in effect defines a Class of Service (CoS) that may be applied to traffic transported on the network. QoS models define bounds on various QoS metrics, such as packet loss, packet delay and the like. For example, one QoS model may define a particular maximum value for packet loss whilst another may specify a maximum packet delay. A single model may also combine multiple QoS metrics. The individual QoS metrics for which a QoS model defines bounds or constraints are also referred to herein as features of the QoS model.

In a simple example, the available QoS models may be predefined and largely fixed. For example, the network may provide a standard set of DiffServ classes of service such as Default PHB (typically best-effort traffic), Expedited Forwarding (EF) PHB (low-loss, low-latency traffic) and Assured Forwarding (AF) PHB (where PHB denotes per-hop-behaviour).

Preferred embodiments of the invention operate in the context of a system which monitors performance characteristics of the network and dynamically identifies classes of service that the network can support. This is based on an iterative learning process, in which various metrics are measured for actual flows traversing the network. For example, a given flow may be associated with a performance metric vector $p=<m_1, m_2, \ldots m_n>$. Each metric corresponds to a different feature of the flow (e.g. packet latency, packet loss, jitter etc.)

A learning algorithm then performs a clustering analysis on the measured metric vectors to identify representative metric vectors that indicate distinct network behaviours (these are preferably the clustering centres produced by the clustering algorithm and are referred to as prototypes). The representative metric vectors or prototypes and their associated clusters then form the basis of a dynamic set of QoS models that can be made available for use. For example, if the clustering algorithm identifies a number of flows that achieve similar levels of packet loss and similar levels of packet latency, a QoS model can be defined specifying the given loss and latency levels (e.g. as bounded ranges, or just upper limits). This QoS model can be made available for use by future packet flows, since the system knows from the observed prior behaviour that the network can support traffic with those characteristics.

FIG. 2A illustrates a set of prototype feature vectors derived by the learning algorithm. Here, each prototype vector includes metrics for the "jitter", "loss" and "delay" features. The clustering algorithm may additionally generate information indicative of the spread of performance values across an identified cluster of which the prototype is representative, for example in terms of confidence intervals. FIG. 2B illustrates a set of 99% confidence intervals for the prototype vectors of FIG. 2A. Together, a prototype vector and associated confidence vector can be used to specify the performance characteristics of a given QoS model.

FIG. 2C illustrates an example of a data table maintained by the system listing details of QoS models including prototypes and confidence intervals (both shown as tuples of feature metric values), available data capacity for each model, along with various statistics for the models.

Each metric corresponds to a given feature of a traffic flow or of a QoS model. Clustering may be performed on any available number of features, so that the learnt QoS models may specify constraints on all features or on any subset of available features, leaving other features unspecified. The feature specification of a QoS model may be considered to constitute a form of Service Level Agreement (SLA), specifying the service level expected when transporting a data flow across the network.

The features and associated metrics can relate to any measurable quantities associated with the network and how traffic is carried across the network. This includes both "hard" performance metrics, such as packet loss, packet jitter and packet delay, as well "soft" metrics such as:

energy consumption (e.g. an estimate of the energy consumed by carrying a packet or flow over a given route)

a cost value representing a financial cost involved in transport of a packet or flow across a route resilience (e.g. an expected rate of failure along a route, for example due to hardware failures, routers crashing and the like)

Some metrics (especially "soft" metrics e.g. cost), may be represented as a set of value bands rather than as a continuum of values, which can enable derivation of more useful and representative QoS models.

When "learning" a QoS model, the system keeps a record of all routes that support the model (i.e. the routes carrying the observed data flows which were the basis for the model). Thus, in addition to the model definitions themselves, the learning process produces a mapping that maps QoS models to routes. An example of a table providing such a mapping is illustrated in FIG. 2D.

For example, a low packet loss QoS model may be associated with route C1-N1-N2-N4-C4 in the FIG. 1 network, whilst a low packet delay model may be associated with route C3-N3-N4-C4. Later, when routing a data flow tagged for a given Class of Service corresponding to one of the QoS models, the network (e.g. the gatekeeper) selects a route associated with that QoS model to carry the data flow.

Referring back to FIG. 1, the learning algorithm is implemented in a QoS learning module 116, which may be part of the gatekeeper 104 or may be implemented separately, e.g. in a dedicated server. In a preferred embodiment, the QoS learning module 116 continues to monitor data flows in the network, and repeats the described learning process at periodic intervals. As a result the set of available QoS models may evolve over time, adapting to resource availability and demand in the network.

The use of a dynamic QoS system with evolving QoS models can make it more difficult for clients wishing to reserve resources for data flows to know what performance characteristics can be supported by the network at any given time. Furthermore, it may be the case that no single QoS model accurately represents the service characteristics desired by the client at that time.

For this reason the system preferably implements a QoS negotiation procedure allowing the client and network to negotiate the characteristics to be applied to a data flow, in terms of a set of available QoS models advertised by the network. The negotiation occurs by interaction between the client 102 with the gatekeeper entity 104.

The purpose of this interaction is to enable a client to query the network about currently available QoS models in the dynamic QoS environment. The network then responds with currently available QoS models, both performance-driven as well as relating to softer routing features, and communicates some of the properties associated with a given model. The client can then query the response and/or respond with one or more QoS models it desires which can be a mixture of performance driven models as well as policy-based models. Based on this the network then allocates a class of service to the data flow and reserves resources for the data flow, e.g. by allocating bandwidth on specific routes that comply with the requested QoS.

The QoS Negotiation Process

This section describes an example of a signalling exchange between a client and the gatekeeper to establish the Class of Service (CoS) to be applied to a data flow.

Data flows may also be referred to as sessions, with a particular CoS being agreed for a session at the start of the session, and remaining applicable until the end of the session (i.e. termination of the data flow), unless renegotiated during the session as will be described later.

Figure 3:
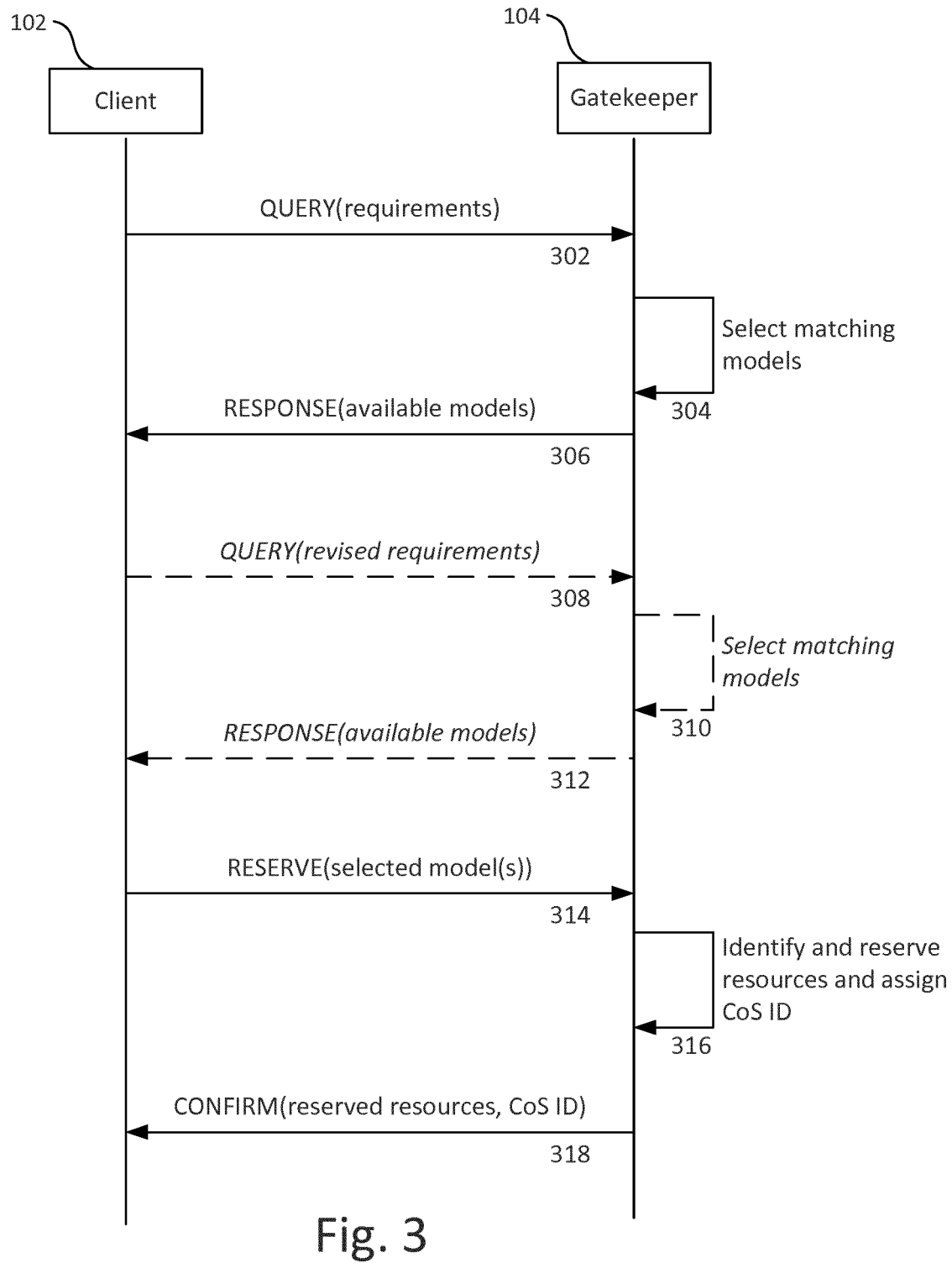
FIG. 3 illustrates a QoS negotiation process between a client and a gatekeeper.

A signalling exchange for the negotiation process is illustrated in overview in FIG. 3.

The exchange starts in step 302 with the client 102 sending a query to the gatekeeper 104, specifying one or more requirements for the data flow. The requirements are specified in terms of one or more QoS metrics. In step 304, the gatekeeper identifies QoS models matching the identified requirements, and provides information about the matching models in a response to the client (step 306). If required, the query and response may be repeated one or more times (steps 308, 310, 312), for example based on revised requirements. In step 314, the client sends a reservation message, identifying one or more of the available QoS models as the basis for a resource reservation. In step 316, the gatekeeper identifies and reserves (if possible) network resources for the data flow based on the selected QoS model(s). This may involve identifying suitable network routes and allocating bandwidth on those routes. The gatekeeper also allocates a distinct CoS identifier for the data flow, representing the negotiated QoS metrics and allocated resources. In step 318, the gatekeeper sends a response indicating the allocated resources and CoS identifier.

The CoS identifier is preferably in the form of a Differentiated Services Code Point (DSCP) value, and is subsequently used by the client to label traffic for the data flow. The gatekeeper or another network component (e.g. edge router) receiving data packets for the flow labelled with the CoS identifier, can then identify the agreed QoS metrics and/or allocated resources for the packets from the CoS identifier and can process and route them accordingly.

In a preferred embodiment, the initial CoS negotiation takes place at admission stage. Therefore, the following assumes that a reservation protocol is in use to send requests from a client (or their interface) to the network (or its gatekeeper). In one example, this protocol is NSIS, specifically QoS NSLP (as defined in Manner et al., "NSIS Signaling Layer Protocol (NSLP) for Quality-of-Service Signaling", IETF RFC 5974). GIST (General Internet Signaling Transport) is typically used as a transport mechanism for QoS NSLP. Note that whilst this protocol is employed in the present example to demonstrate the negotiation capability, the disclosed functionality could be implemented using other suitable protocols.

Note that in this approach the QoS NSLP messaging is only used between client and the gatekeeper and not to make reservations in the network beyond the gatekeeper entity. This is because the resources have already been organised in the network and there is no need for individual reservations. The gatekeeper performs the required translation between the specific client request and the generic network traffic treatment as defined in QoS models.

A preferred embodiment uses the QSPEC (QoS specification) object provided in QoS NSLP to communicate features about the various QoS models available. In particular, the QUERY, RESPONSE, RESERVE message types in QoS NSLP are used with QoS Desired ("QoS_D"), QoS Available ("QoS_A"), Minimum QoS ("min_QoS") and QoS Reserved ("QoS_R") objects with a number of parameters, some of which can be custom-defined by the QoS learning module. QoS_D is used to define the QoS characteristics desired by the client whilst min_QoS can be used to specify the client's absolute minimum requirements. QoS_A is used in the gatekeeper response to indicate the available QoS models matching client requirements, and QoS_R is used to signal the final QoS characteristics configured for the data flow.

Resource Allocation and Traffic Forwarding

As mentioned above, in response to the RESERVE message, the gatekeeper identifies a suitable network route between the required source and destination (e.g. between given edge routers) which supports the selected QoS model(s) and allocates bandwidth on that route. This determination is made using a table mapping QoS models to routes (established during QoS learning), as depicted e.g. in FIG. 2D and discussed previously. In the case where the RESERVE message indicates multiple QoS models, these may be combined to create the final CoS (e.g. a "latency" model may be combined with a "packet loss" model by combining the relevant feature metrics into a new CoS metric vector.

In preferred embodiments, the RESERVE message may specify a priority order (or one may be inferred), with the gatekeeper selecting a route that best meets the selected models in accordance with their priorities. For example, this may involve selecting routes supporting higher priority QoS models in preference to lower quality ones and selecting routes supporting more of the selected models in preference to those supporting fewer models. Where multiple routes are found, route selection can be based on any appropriate criteria (e.g. best fit to requested QoS, load, etc.).

Once a route has been selected for the session/data flow, bandwidth on that route is reserved. In preferred embodiments, routes are established (e.g. by creating tunnels) separately from (and in advance of) the QoS negotiation and flow admission process, with the negotiation resulting in resource allocation on the existing routes rather than creation of new routes/tunnels, so no interaction within the network may be required at this point (such as LSP configuration, route reservation using RSVP, or the like).

Instead, the gatekeeper may simply update route/tunnel configuration records to show that a given bandwidth quantity on a route has been consumed. Additionally, routing tables may be updated to associate the data flow with the route(s) assigned (e.g. mapping the assigned DSCP value to a specific route or tunnel). This may involve configuration at the gatekeeper itself and/or configuration at one or more network components, typically edge routers. After configuration, data flows arriving tagged with the agreed DSCP value (representing the specific Class of Service negotiated for that data flow) are then routed onto the assigned route.

It is also possible that a single route does not have sufficient bandwidth to support a session. It is possible that a collection of routes exist each of which satisfy the priorities in the same manner (or to different but acceptable degrees) but for smaller bandwidths. It is then proposed that the gatekeeper load balances between such routes. The selection can be done in a greedy manner such that the route with the highest available bandwidth is assigned as much as possible, following which the table is searched for the next route that performs sufficiently to assign the remaining portion. In this case, multiple routes will be associated with the DSCP value, and traffic tagged with that DSCP value is load-balanced across the assigned routes in accordance with the respective bandwidth allocations, using any appropriate load-balancing algorithms. Routing of traffic may occur at the gatekeeper itself and/or at other network components, e.g. edge routers.

The result of the initial negotiation is therefore that a Class of Service is assigned to the data flow. This CoS may be based on a single QoS model or a combination of QoS models (e.g. by selecting routes that can support multiple requested QoS models). Accordingly, where reference is made herein to an assigned CoS based on a QoS model supported by the network, it shall be understood that the CoS may be based on multiple such models.

Modifying a Data Flow's CoS During the Lifetime of the Data Flow

Using QoS negotiation approach described above, the choices that the client has depend on the QoS models on offer from the network at the time of negotiation—i.e. at admission time, prior to commencement of the data flow. However, the QoS model selected at admission stage may not be the optimal QoS model over the entire lifetime of the data flow. For longer-lived data flows, the available models may change during the lifetime of the data flow, with more appropriate models becoming available or the currently used model could be withdrawn. Furthermore, performance in the network may change so that the current model may no longer be appropriate.

To address this, embodiments of the present invention allow for renegotiation of the QoS applied to an existing data flow during the lifetime of that data flow.

While particularly useful in an environment using time-variant QoS models (e.g. using an iterative learning approach as described above), the approach could also work in a more static environment in which the available QoS models are fixed (e.g. classic DiffServ), for example to respond to changes in network conditions.

The system uses a number of trigger conditions to initiate renegotiation of the data flow's CoS during the lifetime of the data flow, e.g. by proposing of a set of alternative QoS models that might be suitable for the data flow. QoS NSLP is again used for the renegotiation, though any suitable protocol may be employed and the protocols used for initial negotiation and subsequent renegotiation may be the same or different. Renegotiation may be triggered by the network (e.g. gatekeeper) or the client.

More specifically, disclosed embodiments provide:
A system that allows re-negotiation of QoS treatment for services that have already been admitted into the network under certain circumstances using a suitable set of QoS models, where the conditions as well as the offered models are determined using data analytics
A method and a set of trigger conditions, i.e. contexts, that can be used by the network (e.g. the gatekeeper) to initiate this re-negotiation and a mechanism for communicating this information to the end client whilst the service is underway
A method and a set of different trigger conditions for clients to trigger re-negotiation as well as a mechanism for performing this task whilst the service is underway.

Figures 4, 5, 7:
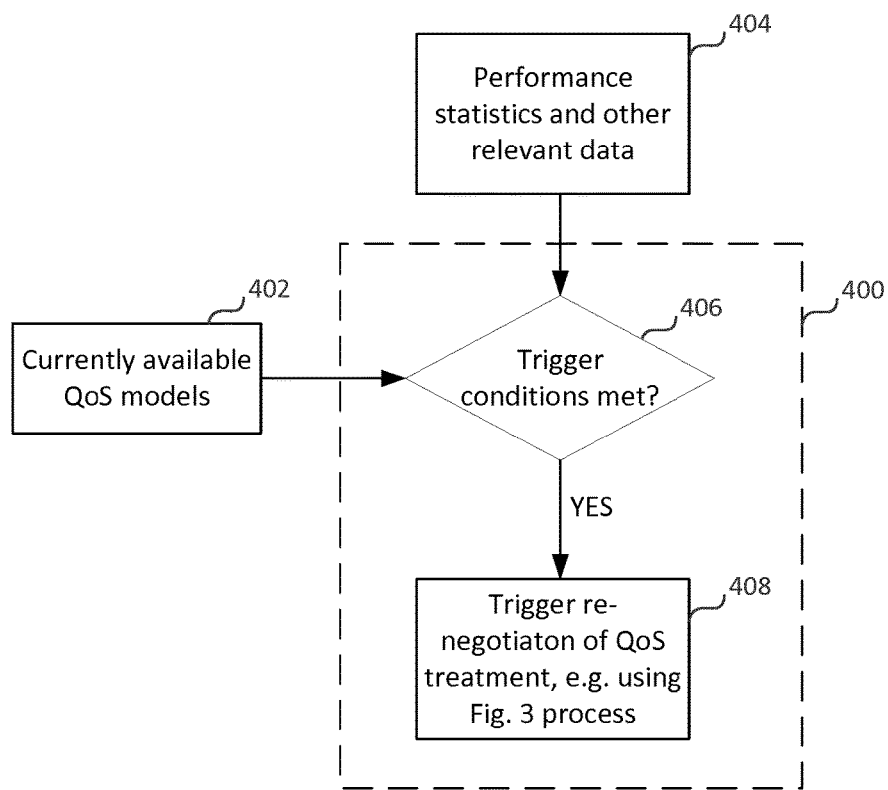
FIG. 4 illustrates renegotiation of QoS in response to a trigger condition.
FIG. 5 illustrates QoS characteristics recorded for a set of past requests.
FIG. 7 illustrates a set of renegotiation rules applied by a client.

FIG. 4 illustrates the renegotiation process in overview. In this example, the process is performed by a monitoring component 400 which may be part of the gatekeeper, but the process could be performed at the client or elsewhere in the network. In this example, the monitoring component receives information on the currently available QoS models 402, as well as network performance data 404 (e.g. indicating performance on given routes, and/or performance of the data flow in question). At 406, the monitoring component determines whether any predefined renegotiation trigger conditions are met. If any trigger conditions are met, then renegotiation of QoS treatment is initiated in step 408. Note that, if performed at the client, then the information available and used for triggering renegotiation may be different (e.g. the client may or may not have access to up-to-date information on the available QoS models and may only be able to measure performance of the specific data flow rather than the network as a whole).

The renegotiation may use the process of FIG. 3 (altered as necessary, e.g. by removing the initial query stage). Thus, the renegotiation may involve communication of multiple QoS models to the client from which the client chooses the best option (by issuing a "reservation" request as in FIG. 3). Alternatively, it is also possible that the network makes such a choice on behalf of the client and communicates this to the client and requests an updated reservation message to go ahead with the change.

The following are examples of conditions where the network can trigger re-negotiation with a given client who is currently sending traffic of a given Class of Service C1:
 1. Time-based: e.g. Periodically
 2. Actual or forecasted underperformance—e.g. on prediction of degradation of service, compared to pre-agreed QoS or compared to other similar sessions
 3. Similarity to original request: In accordance with a new QoS model of CoS C2 where the features of C2 are closer to those requested by the client in their original request
 4. CoS withdrawal
 5. Promotion of additional features: Upselling of additional features in new QoS models Examples of conditions where a client can request a re-negotiation include:
 1. Time-based: e.g. periodically
 2. Performance-driven: Trading cost of delivery against desired performance as well as variations in desired performance
 3. Traffic-driven: Change of traffic type The following sections described these conditions in more detail.

Network-Triggered Renegotiation

1. Time-Based

The gatekeeper may trigger renegotiation at predetermined times and/or periodically. For example, this may occur a specified time period after the initial or last negotiation or at predetermined times of the day.

In this case, the gatekeeper can start the FIG. 3 negotiation process at step 306, by communicating a set of available models to the client. These may be selected from the currently available models, based on requirements communicated by the user in an earlier (or initial) negotiation.

2. Detected or Forecasted Underperformance

In preferred embodiments, the system measures performance of the network continuously. This includes measuring performance characteristics of specific data flows. Aside from its use in future iterations of the QoS learning algorithm, the system uses this information to compare the performance of the data flow against the agreed QoS characteristics for the data flow (as negotiated at admission or a more recent renegotiation), where the agreed QoS characteristics may be defined in terms of one or more QoS models.

The performance characteristics may be measured as a vector of performance metrics, and the relevant metrics are then compared to those of the agreed QoS model. The QoS model may not specify values for all measured performance metrics and so only the relevant metrics may be compared. The comparison may include determining a difference measure (e.g. Euclidean distance) between measured and agreed QoS vectors. A threshold is then used to determine if the divergence from the QoS metric is sufficient to trigger renegotiation. If the difference measure exceeds the threshold, renegotiation is triggered; otherwise the data flow is allowed to continue with the current agreed class of service.

The approach may be refined to allow for a range of acceptable QoS behaviour. For example, the confidence intervals defined for QoS models may be used to define an acceptable performance envelope for the data flow (see FIG. 2B). A performance envelope may be defined in some other way, e.g. based on fixed tolerances. If the performance fall outside the envelope (or exceeds the bounds of the envelope by more than a threshold distance), then a QoS violation is detected and renegotiation triggered.

Specifically, for the traffic flow under consideration, an average QoS vector q is computed over the last time period t by computing the average metric values for QoS components offered by the QoS model assigned to the flow. After computing the QoS vector q for a service flow, the system then determines if it lies within $p \pm c$ (where c is the confidence vector associated with the model and p is the model prototype as discussed in connection with FIGS. 2A and 2B) or any other agreed performance envelope. If all metrics are within the defined envelope the performance matches the operator's expectations for the QoS model; if not, i.e. if at least one component of q is worse than the agreed envelope for that component, then there is a QoS violation.

As a further refinement, performance may also be monitored over a time period and an analysis performed to determine trends in performance and forecast expected future performance (e.g. based on linear extrapolation from past samples). Expected performance at some future time (preferably earlier than the next iteration of the QoS learning algorithm) can then be compared to the agreed QoS model (or more specifically, a QoS envelope for the model), as described above. Renegotiation can then also be triggered if violation appears likely in the future.

The renegotiation can involve proposing suitable alternative QoS models or simply triggering a re-negotiation request with no information about available QoS models, as described in more detail below.

Instead of simply evaluating current or forecasted performance for a specific data flow against the agreed QoS, a further type of underperformance-related trigger involves a comparison of current or forecasted performance of the evaluated data flow (or group of data flows) against similar data flows in the past, from the same or a similar set of clients. This is done by comparing the performance metrics collected in real-time about service performance to a historical record of service performance for the same client or similar clients.

Determining similarity between clients can be done e.g. using packet inspection, if necessary. Comparisons can be done on an application type (if the application can be determined by packet inspection using source-destination-port number combinations), i.e. using historical data to answer the question "how does the performance of this application compare against similar applications from the same client or other clients in the present and/or the past who have also sent data of the same application type?" It is also possible that such a comparison can be done for a number of data flows (or sessions) of the same application type (same port numbers but different source-destination combinations with a possibility of geographical segmentation to collect similar sessions in the same region). Alternatively, comparisons can be performed at a less granular per-FEC level, which might be more appropriate if a number of different applications collectively use a certain QoS model and determining individual application performance for all these sessions would be too onerous.

The outcome of the comparison is that the currently-evaluated client C1 should ideally have a performance Q1 (which can be a vector of many features), determined from the performance experienced by similar sessions/applications either presently on other QoS models or in the past, instead of their current/forecasted performance of Q2. Therefore, the task for the network is to find a QoS model that currently offers a performance of Q1 or better and recommend this to the client using the notification mechanism described below.

3. Similarity to Original Request

It is possible that a client that currently sends traffic over an admitted data flow did not actually get the QoS they initially desired. This is typically due to unavailability of a suitable QoS model to support the requested features at the time. This trigger condition addresses that scenario.

Thus, when new QoS models become available, the system determines which of the existing clients should be offered one of the new QoS models based on a comparison of their original request to the currently available QoS models.

Their initial request would be recorded in a table similar to that shown in FIG. 5. This can be derived either from the Initiator QSPEC (i.e. the first QUERY message of the FIG. 3 process) and/or from the RESERVE message specifying the QoS model(s) selected as described previously.

The operator can decide which request (the first QUERY or the RESERVE) should be retained as a representation of the client's 'original' request. For example, the RESERVE message can be used as the original request if the network was unable to offer the requested QoS requirements due to operator-enforced priorities or unavailability of resource. The most recent RESERVE can be used for sessions which have already re-negotiated before and therefore the Initiator QSPEC might be out of date. The RESERVE is also used as the original request when the client has chosen to RESERVE different features to the ones initially requested in view of additional models that the network offers which they were unaware of at the time of sending the Initiator QSPEC. If this is the case, the RESERVE message is considered to be the most representative communication of the client's desired QoS. It is also possible that the network does not make this distinction and offers models that suit both the initial QUERY or RESERVE, or that suit either.

Nevertheless, irrespective of what is considered to be the original request, using the information in this request from the client, the network is able to find QoS models that best suit this request and recommend them using the signalling described in more detail below.

With this approach, the network can offer more recently generated QoS models (e.g. generated based on performance, network or demand considerations) which were not available at the time QoS was first negotiated for the data flow. The new QoS models may match an original request from the client which could not be satisfied at the time (or may match the original request better than the initially agreed QoS model). The network can choose to offer such models under certain conditions, e.g. if the performance RESERVED is worse than that requested in the initial QUERY, even if the RESERVED QoS is still being delivered. Alternatively a new QoS model can be offered if its performance P2 is closer to the requested performance P1 than the performance P3 of the current model. Note that it is possible to apply the same recommendation to a FEC or to a collection of services in the case of aggregated negotiations from a client, an intermediate interface or aggregation point.

4. CoS Withdrawal

Renegotiation may be triggered if a QoS model associated with a data flow has been withdrawn (for example following an iteration of the QoS learning module). The system can then identify alternative QoS models that meet the previously agreed or originally requested QoS metrics and notify the client using the notification mechanism described below.

5. Promotion of Additional Features

This trigger condition focuses on the potential to push more features to the client than they had initially RESERVED. The incentive to do this for the operator is to promote desirable traffic features. This can be, for example, to maximise revenue or to increase traffic that travels over more stable QoS models. A new set of QoS models are recommended to a client if the performance of the new QoS model is similar or better to the existing model and there is an additional feature that the network considers to be beneficial (for the client or the network). For example, if a client currently has traffic routed on a class of service C1 which offers a resilience SLA, the network might offer this client a new QoS model that has both the desired resilience and a performance SLA. The addition of the new QoS model can be then used to influence dynamic pricing for this client. Alternatively, a client who currently has a class of service that offers minimum energy utilisation can be offered a new QoS model that not only offers the same or lesser energy utilisation but also a performance-related SLA.

Note that the network can layer as many additional features as desired in making its recommendations. One consideration to take into account is that, as the number of constraints increases, the number of routes that can support these constraints in a stable manner is likely to decrease. Therefore, the system may be configured only to offer one additional feature on top of an existing feature in order to increase the chances of being able find such instances where this is possible and also have a higher likelihood of assuring the more complex QoS model from the network routing perspective.

The network (e.g. gatekeeper) decides which QoS features are to be recommended. It can choose to do this based on a similarity measure. The example described further below sets out a step-by-step approach and a list of conditions to identify which QoS models to offer.

The above has described various distinct trigger conditions for the network to initiate a renegotiation of QoS treatment. However, additional alternative trigger conditions may be used. Furthermore, trigger conditions can be combined in any way. For example, the network can trigger a re-negotiation when performance is likely to deteriorate and there is the possibility of adding a new feature to the new QoS model that the client might find desirable. Alternatively, the network can trigger a re-negotiation for a client's original request only if there is the possibility that making this change increases operator-desired traffic on the network. Another example is for an operator to trigger re-negotiation not only when performance is forecasted to degrade below a static agreement on what is considered a breach, but also based on a comparison of performance to other sessions, with renegotiation only triggered if both conditions are met.

Client-Triggered Renegotiation

1. Time-Based

The client may trigger renegotiation on a time basis (e.g. periodic or at specific times) as described previously for network-triggered renegotiation.

2. Performance-Driven

It is possible that it is not in the interest of the network operator to offer a client a cheaper QoS model without some incentive in doing so, e.g. reputation, credibility etc. Therefore, it may be in the interest of the client to re-negotiate if the client finds that the performance experienced by a session (or aggregate) is better than it desires for the traffic flow. For example, end-to-end performance measures made by the client, TCP feedback or other application performance data can be used by the client to request a lower QoS performance if the higher QoS values are measured to be unnecessary. Such re-negotiations can also be done in a forecasted manner using regression methods previously described, i.e. into the future.

Additionally, the client might have a system where end-to-end QoS is segmented across multiple networks, of which the current network is one. The local segment QoS desired from this network might have changed due to changes in network conditions such as alleviation of congestion elsewhere, which results in the client being able to relax their QoS requirements and trade this off against potential cost saving.

3. Traffic-Driven

The client can trigger re-negotiation of QoS based on their traffic profile. For example, the client may send certain types of traffic at certain times to exploit variations in pricing as well as performance models. Therefore, should a client desire to utilise this flexibility and is able to profile their traffic in time or using any other variable, they can trigger a re-negotiation for different types of traffic at different times of day over the same connection (where a connection corresponds to a session or data flow) instead of tearing down a connection and re-establishing a new one. This profiling information can be known in advance or determined dynamically. Optionally, applications or traffic flows may be classified to FECs in advance so that the correct QoS requirements are requested for the respective flows.

Signalling and Further Actions

This section describes the signalling method proposed, using QoS NSLP as an example, to carry out QoS renegotiation for a data flow.

As indicated previously, the renegotiation is preferably implemented on the basis of the initial negotiation process depicted in FIG. 3.

In preferred embodiments, the client can indicate whether or not it wishes to receive such in-life re-negotiations in the RESERVE message. This can be done using a specific parameter in the QSPEC object. Alternatively, a client can receive such re-negotiation options unless opted out.

The network can choose to send its re-negotiation request, along with the QoS models it wishes to offer, using a NOTIFY message which can be unsolicited or a QUERY message requiring a response from the client. All the information about QoS models being offered can be wrapped into a QSPEC object in the same way as for the FIG. 3 process.

The network can alternatively only provide a trigger for re-negotiation without actually publishing any of the QoS models it wishes to offer at the time for the existing service, in which case, it might not solicit a RESPONSE from the client. Once the client receives this notification, it can choose to ignore it if it does not require a RESPONSE. Alternatively, it can deny the re-negotiation request by sending a RESPONSE with an appropriate error code in the INFOSPEC object. The client can choose to amend its preference for receiving future notifications of this nature from the gatekeeper in its response or indeed amend the information held for the client at the gatekeeper to improve future suggestions. For example, if the client does not wish to switch to a QoS model that corresponds closely to its initial request because it is satisfied with the performance of the current model or does not wish to incur any risk in changing, it can specify this preference in this RESPONSE INFOSPEC as well.

Figure 6:
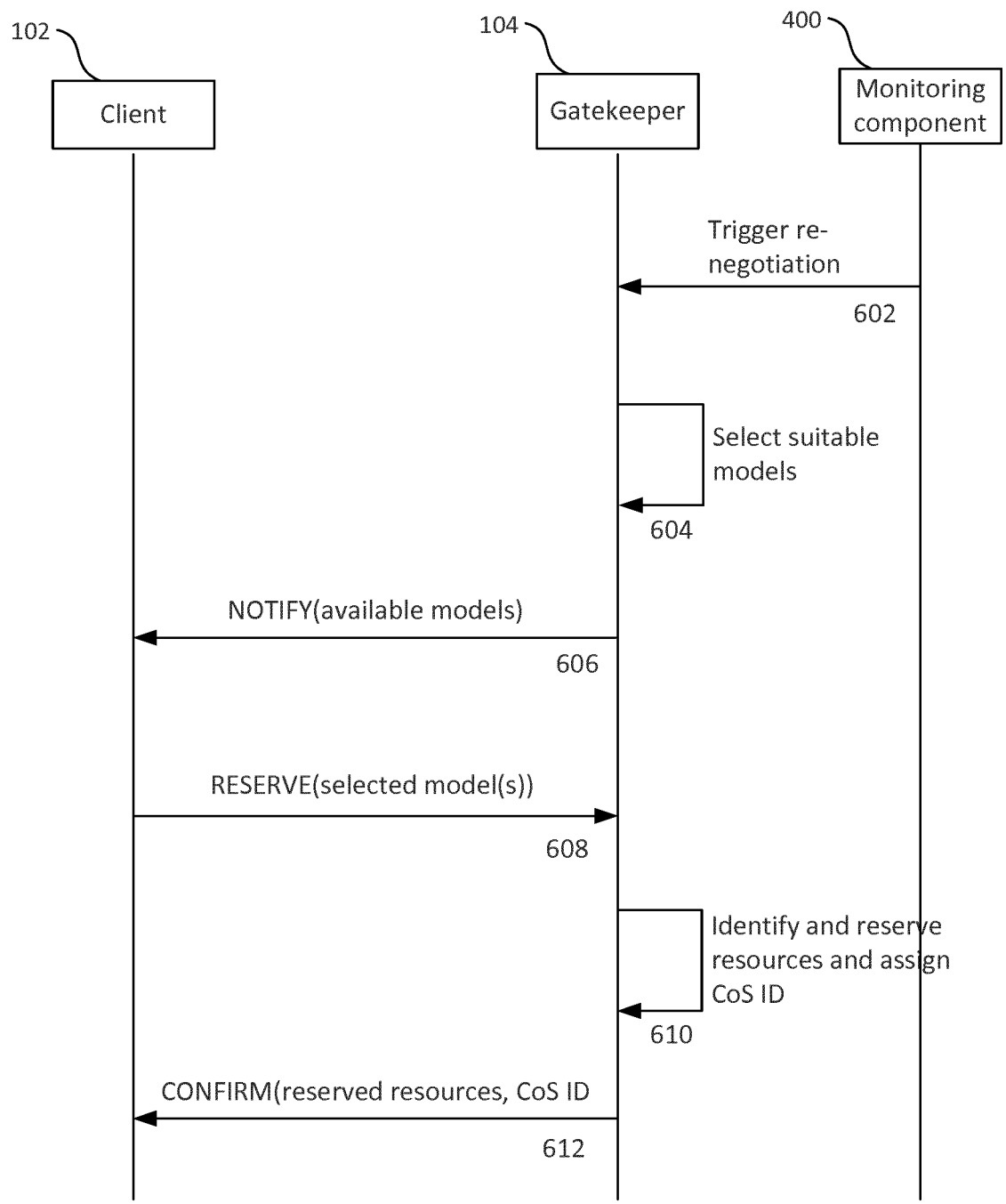
FIG. 6 illustrates a QoS renegotiation process.

An example signalling change is illustrated in FIG. 6. Here, the monitoring component 400 triggers re-negotiation for an existing data flow in step 602, e.g. based on one of the previously described trigger criteria (note that the monitoring component may in practice be part of the gatekeeper).

In step 604, the gatekeeper selects suitable QoS models for the data flow (where the selection may depend on the reasons why renegotiation was triggered; details of the selection have been described above and further details are given in the example section below). In step 606 the gatekeeper sends a NOTIFY message indicating the available alternative QoS models for the data flow. This essentially takes the place of the RESPONSE message sent from gatekeeper to client in the FIG. 3 process (and as in the FIG. 3 process, additional QUERY/RESPONSE exchanges could be added to refine model selection). The process then continues essentially as in FIG. 3: in step 608, the client sends a RESERVE message to reserve resources based on one or more selected QoS models, and the gatekeeper reserves resources and confirms the resources in CONFIRM message 612.

However, in the case, the client can preferably bind its RESERVE message to the previous signalling (of the initial FIG. 3 negotiation) using session/message binding provided in QoS NSLP to prevent the network from interpreting this as a new reservation and also keep statefulness about this RESERVE message, if necessary.

As part of the reservation of the new CoS, the gatekeeper may again assign a CoS ID which is transmitted in the CONFIRM message. Alternatively, the new CoS may be bound to the existing CoS ID already used by the client for the data flow in question, in which case no change (and signalling) of CoS ID is needed.

FIG. 6 illustrates network-initiated renegotiation. On the other hand, when a client wishes to trigger re-negotiation, it can use a QUERY message soliciting a RESPONSE to request current available QoS models with a refreshed QSPEC object specifying its current QoS requirements. The process can thus proceed as in FIG. 3, except that the client can use session/message binding to associate this message with its existing session (i.e. the existing data flow) rather than creating a new reservation. In that case, the gatekeeper therefore responds with a RESPONSE and proceeds as per the negotiation process of FIG. 3.

Note that the above merely gives examples of how renegotiation may be performed and in practice the signalling between client/network to achieve the QoS renegotiation can be carried in any appropriate fashion once one or more of the previously described trigger conditions are met.

DETAILED EXAMPLES

Network-Initiated Renegotiation

The following examples are intended to illustrate some of the trigger conditions and other features of the renegotiation process described above.

In this example, consider a scenario in which the system is evaluating whether a session (or group of sessions) S1 requires QoS renegotiation (note that a session corresponds to a data flow as per the previous discussion). Session S1 originally requested a set of QoS features Q1, mapped onto model M1 at the time of admission and DSCP value of D1, and is now experiencing (or forecasted to experience) a performance of P1. A discussion of what might constitute an original request from the client has already been provided above.

At the time of evaluation, new/alternative QoS models are available in the network. The network has collected a historical record of sessions S={S2, S3, . . . Sn} as well as their requested QoS performance Q={Q2, Q3, . . . Qn} and their actual QoS performance P={P2, P3, . . . Pn}. Optionally, the models used by S are recorded as a set of QoS models $M_{hist}$={M2, M3, . . . Mn}. Each of the elements in Q, P and M can be vectors themselves, representing the various QoS features of the specific groups of sessions in S. Similarly, Q1, M1 and P1 are also vectors of QoS features associated with S1. Elements within the individual vectors can be performance-related or softer policy-related. Some of the traffic in S is still traversing the network and other sessions completed transmission in the past. The current set of available QoS models can be represented as $M_{curr}$ where some models in $M_{hist}$ may still exist in $M_{curr}$. The set of QoS features offered by QoS models in $M_{curr}$ is referred to as set F. Each element of set F is a performance vector that describes the corresponding QoS model in $M_{curr}$. Note that elements of S and element S1 can themselves be aggregates of individual traffic flows.

Example

Underperformance with Respect to Similar Data Flows

As described previously, one measure of underperformance that can be used to trigger renegotiation is based on a comparison of the current traffic flow performance to that of similar traffic flows from the same or similar clients in the present and/or in the past. This is collectively referred to as 'similar traffic behaviour'. This step involves a characterisation of what constitutes similar traffic. In one example, this could be all traffic from all clients that currently request the same DSCP value and therefore desires the same traffic treatment. Alternatively, it could be all traffic that requested similar QoS model performance (past and present).

This can be determined by:
Comparing requested traffic performance features of historical sessions and collecting traffic that requests a similar set of features into 'bins', and
Comparing the actual performance that the closest collection of sessions experienced to that of the current traffic flow.

Collecting traffic from S into bins can be done using clustering or simple distance comparison of vectors of requested QoS features Q from one request to another and placing sessions that have vector distances less than a threshold into the same 'bin' (i.e. requesting similar performance). The 'bin' that is closest to the current flow S1 is one that S1 would be clustered to, based on its requested QoS features Q1 (if clustering is used), or the one that is closest in vector distance of Q1 (if simple distance measures are being used). The outcome of this step determines to which traffic group $S_{Gr}$ (a subset of S consisting of a set of sessions {Sx, Sy, . . . Sm}) the current session S1 will be considered to be most similar. Furthermore, additional filtering before clustering/vector distance computation can be applied to only consider sessions from S that occur at the same time, from the same client, of the same application type/port number (if packet inspection is possible) or indeed any other set of further conditions that when applied result in a set of sessions $S_{Gr}$ which can be considered similar to the current session S1.

The system then compares the aggregated performance $P_{Gr}$ (subset of P) to P1. $P_{Gr}$ can be a moving average to aggregate all performances {Px, Py, . . . Pm} of $S_{Gr}$={Sx, Sy, . . . Sm} into a single line. The comparison of $P_{Gr}$ to P1 can also be done using vector distance on a component-by-component basis. Some features in this distance computation can be weighted to be more important than others, or in the case of this example, all QoS features can be of equal importance. Using this comparison, the system can determine how current group of sessions S1 performs against a similar group of sessions and subsequently identify when S1 could perform better compared to these similar sessions.

The performance subset $P_{Gr}$ thus provides a performance threshold, but rather than being pre-defined it depends on other "similar" sessions. Therefore, what might constitute underperformance in one instance might not be considered so in another, due to variations in what is considered similar. Once the time-dependent threshold for underperformance has been computed from $P_{Gr}$, the previously described methods can be used to determine whether or not underperformance is actually likely to take place.

If degradation (e.g. QoS noncompliance) has not occurred/is unlikely, then renegotiation is not triggered. Alternatively, if the comparison indicates that degradation has occurred/is likely, then a set of QoS models from $M_{curr}$ that satisfy Q1 can be proactively identified and signalled to the client using a NOTIFY message as previously described.

In this scenario, the renegotiation involves two proactive steps: 1) determination of underperformance, 2) determination of suitable QoS models following determination of underperformance. The system, by design, is proactive in its determination of underperformance. However, it may choose not to proactively search for suitable QoS models and the client may be left to identify a new QoS model to use (e.g. from a published set of QoS models) based on the features of currently available $M_{curr}$. In this instance, the NOTIFY message will not contain information about potentially suitable QoS models from $M_{curr}$.

Example

Renegotiation Based on Similarity to Original Request

In this example, renegotiation is triggered based on availability of QoS models in $M_{curr}$ that are closer in QoS features to the original request Q1 than that of chosen model M1. This is also determined using distance computation of vectors. In the previous example, performance of groups of sessions $S_{Gr}$ was compared to P1, whereas here performance of groups of models $M_{Gr}$ is compared to P1.

In particular, once the QoS learning module has identified $M_{curr}$={Ma, Mb, . . . Mz} and its associated QoS features F={Fa, Fb, . . . Fz}, the features Q1 are compared component-by-component to elements of F to identify a subset $M_{Gr}$={Mx, My, . . . Mm} which are closer in distance to Q1 than those of M1. Note that QoS features of M1 can either be characterised as the original QoS features F1 of the model or the current/forecasted performance of the model which is represented by vector P1. If the comparison is made against the current/forecasted performance P1, then a new model will be offered if the forecasted performance is worse than the QoS features offered by the new model which makes the embodiment both performance-driven as well as request-driven. This is an example of how two or more methods of triggering QoS renegotiation can be combined. Alternatively, current/forecasted performance P1 can be ignored and only the original features F1 of M1 are compared against features F of $M_{curr}$. Alternatively, current/forecasted performance of $M_{curr}$ can be derived from P and compared against current/forecasted performance P1 instead.

The component-by-component vector distance of each set of QoS features in F is compared to vector Q1. This results in a list of distances associated with the elements of $M_{curr}$ that were compared to Q1, the original requested QoS features for session S1. Each of the distance elements in this result vector is subsequently compared to the distance of P1 (which is representative of the forecasted features of M1) to requested QoS feature set Q1. A model from $M_{curr}$ is assumed to be closer to Q1 if its distance is smaller than that of M1 to Q1. Note that this distance can be representative of a number of attributes. For example, the distance can take into account features that exist in Q1 and in a new model Mx but do not exist in M1, i.e. M1 lacks a desired Q1 feature. Alternatively, a new model My can be suggested if its band of operation is closer to that desired in Q1 compared to that in P1 (i.e. better performance in existing QoS feature). All these variations are possible simply by changing the way the QoS features are discarded or retained in the distance computation between performance vectors.

The outcome of the comparison is that a subset of $M_{curr}$, referred to as $M_{Gr}=\{Mx, My, \ldots Mm\}$, is identified as being a more suitable set of options to the original request from S1 compared to the currently used model M1. We have assumed that M1 is best represented by its current/forecasted performance of P1 and that $M_{curr}$ is best represented by its QoS features F. If any elements of $M_{curr}$ are also available in $M_{hist}$, P can be used instead of F in these instances in order to have a better representation of the performance of such QoS models (actual QoS vs. promised QoS). The resulting set $M_{Gr}$ is signalled to the client in a NOTIFY message and renegotiation is triggered.

Example

Promotion of Additional Features

In this example, renegotiation is triggered for the purpose of offering additional features on top of what has already been agreed upon. This is different to the previous contexts where renegotiation was triggered when underperformance is detected or when a QoS feature becomes available that is closer to the client's request than the current model. Both of these conditions imply that the client's request could be better served in the present time and the purpose of the renegotiation is therefore to improve service to conditions that were already agreed upon or requested. The present trigger condition is met even when performance that was agreed upon or requested is being served but there is a possibility of providing an additional feature on top of currently satisfactory QoS.

For example, the current QoS model M1 that a client uses is compared to available models to the same destination (either the same route or other routes to the same destination) and the similarity/difference between the two is determined using a vector distance measure. We propose that a model with a new feature F1 of any performance band within this feature is more likely to be recommended than a different model that has a much better performance band within the same feature F0. Note that F1 and F0 are individual components of a single vector within F. F1 can be energy-awareness and F0 can be resilience or performance. Therefore, when a new list of QoS models $M_{curr}$ is available, the current QoS model M1 of, for example, resilience/cost/performance SLAs (negotiated as described previously) is compared against the other QoS models. Assume that there exists a second QoS model M2 in the new set with SLAs against resilience/cost only. This model will be discarded because it does not provide an SLA that is already being supported, which is performance in this example. This results in the first step of the test:

1) Eliminate QoS models that do not have all the features supported by the current QoS model.

A third model M3 offers SLAs against resilience/cost/performance. This model is also discarded as it does not contain a new feature compared to M1. Note that M2 and M3 might have been considered in previous trigger conditions but do not qualify further in this context. This leads to the second test:

2) Eliminate QoS models that do not have any additional feature to those already supported by the current QoS model.

A fourth model M4 offers SLAs against resilience/cost/performance/energy and a fifth model M5 also offers resilience/cost/performance/energy as well but the band of operation for the performance feature in M5 is far better than that of M4. All other bands of operation (resilience and cost) are the same. Another model M6 offers SLAs against resilience/cost/performance/energy but the band of operation of resilience is worse than that of M1. All other bands of operation are the same. Therefore, a selection is now made between M4, M5 and M6. There are three pairs of models to compare now (M1 against M4, M1 against M5, and M1 against M6), in order to determine whether any of these models will be proposed to the client. The determination is made as follows:

3) Evaluate, feature by feature, if M4, M5 and M6 are better than M1 for the features that are common between the pairs.

This is done by subtracting the band value of M1 from M4 for every feature separately and determining if this value is positive or negative. The same is done for every band value that is common between M1 and M5 as well as M1 and M6. A positive value for a particular feature is assumed to mean that the feature is better in performance than M1. We eliminate QoS models that have any negative values as this means that the specific feature is worse in the new model compared to the current model M1. This means that in this example, M4 and M5 will pass this test as they both have performance in common features that are the same or better than that of M1. However, M6 will not pass this test because its resilience band is worse than that of M1 and this value will be negative in the outcome of this test.

At this stage, either M4 or M5 can be offered to the client. The choice of which is offered can be made at random or in some prescribed form, taking into account a different criterion (e.g. likelihood of keeping up this SLA, likelihood of adverse impact on other services in the new QoS model or indeed maximising revenue).

In one example, the selection is based on which of the two models M4 and M5 are closest to the model M1 in features that are common between them. The system therefore offers the same or similar performance for features that already exist in the current model rather than proposing a model that vastly changes performance of current features as well as introduce a new feature. Such behaviour might be considered undesirable for the client as it might also incur an additional change in the dynamic pricing band. The step below therefore verifies that the model that is finally chosen is the closest possible model for features that are common between the new model and the current one:

4) For the remaining models, evaluate the distance between the features that are common with M1.

This is done by squaring the difference obtained in step (3) above and adding the individual squared differences across all the components that exist in both models of each pair (M1/M3 pair and M1/M4 pair) and taking the square root (Euclidean vector distance). In the above example, the shared components are features resilience, cost and performance. In this step, it will be found that M4 will be closer to M1 than M5 and therefore M4 is the chosen model to recommend.

Therefore, for features that already exist in a current QoS model, the system attempts to find a QoS model that offers the closest possible band of operation to that currently in use whilst simultaneously offering an entirely new feature on top of what is currently being consumed.

The example above assumes that the bands of operation within the individual features (performance, cost etc.) are not considered to be as significantly different to each other as two different features entirely. It is possible that the operator chooses to implement this differently and makes a recommendation even if there is not an additional feature between two models but the performance of the new model is much better than that of the current model (i.e. skipping out step (2) entirely). This overlaps with one of the previous trigger conditions as well. It is also possible that the search is done in a different order (i.e. step (3) before step (2)) to help narrow down the search space more quickly.

Alternatively, a network operator can determine which additional features should be offered to which clients on a static basis or alternatively this can also be determined dynamically based on past behaviour of the same type of traffic (from the same or similar client). Such pruning of options affects the set of QoS models to be evaluated against the current model and might aid in reducing search time.

Detailed Examples

Client-Initiated Renegotiation

Example

Performance-Driven Renegotiation

A client can monitor end-to-end performance in a number of ways. It can be reported by applications, scored by users or reported by higher-layer transport features such as RTCP which collects statistics for session performance and reports this back to the sender. We have already described that sessions can be characterised by a desired performance, which may be represented in the set of features Q1. Alternatively, the client can maintain a local record of desired application performance from which Q1 was derived at admission time either as an aggregate of several individual application performance descriptions or taking into account available QoS features. Such a local desired application performance can be maintained in order to map applications into FECs.

Using the desired application performance and the feedback received from RTCP or similar, the client can determine if the feature performance P1 given by the current QoS model M1 is suitable against the desired behaviour. In the absence of further information, such a comparison can be in the form of a vector distance computation between P1 and Q1. If more granular information about desired application performance or RTCP feedback is available, this can be used to make the comparison instead.

We refer to the generic vector that describes desired QoS behaviour as QD which includes sources such as client-side application specification, application-to-FEC mapping information combined with associated FEC desired QoS treatment or local segment QoS behaviour requirements. The generic vector that describes received QoS behaviour is referred to as QR and this can be feedback from RTCP or similar, application-layer feedback, end-to-end aggregated feedback taking into account local QoS behaviour, current/forecasted performance P1 for M1 or offered QoS features F1 for M1. The comparison of whether QR matches QD is done using the vector distance computation with a predetermined acceptable upper and lower bound behaviour for the session S1. Note that an upper bound in desired performance might be desirable in order to limit unnecessary cost if the network performs better than expected and dynamic pricing is in place.

Using these upper and lower bounds of similarity between QD and QR, the client can trigger renegotiation of QoS models with the network. This can be done by altering the objects in QoS_D in a new RESERVE message or sending a QUERY message with the amended QoS_D object, both with the same message/session binding ID as the existing session to signal that this is not a new request but an amendment for an existing request.

Note that in this trigger condition, the client can proactively trigger renegotiation in the case of perceived under- or over-performance. The client need not rely on the network being capable of detecting underperformance if it is able to do so by itself. Similarly, the network is unlikely to offer a QoS model that performs worse than the current one (i.e. fewer features or worse band of performance)—it has no way of knowing that a worse QoS performance is still acceptable for the application and the operator might not have any incentive in offering such a worse model even if this information is known. Therefore, it is up to the client to determine when the application can trade down in performance and still maintain its desired features.

Alternatively, it is possible that the specific application performance has been diluted down in the aggregation process of creating FECs across many applications and also in the negotiation of Q1 with the network. Over the course of aggregation, even if Q1 is being supported by M1 and P1≈Q1, this performance P1 might not be suitable for the specific application group that was previously aggregated into Q1 at the time of admission. Therefore, by allowing the client to trigger renegotiation, such aggregation errors can still be overcome by the client, taking into account in-life service performance, and indeed the client need not expose the specific application-level performance to the network in its negotiation process.

Example

Traffic-Driven Renegotiation

The client can choose to send different types of traffic at different times. The application profile and its desired QoS features have been referred to as QD which can change with time. Therefore, knowing client behaviour and/or forecasts about future applications, the client can renegotiate an existing session to fit the traffic requirements.

Note that if the client has foresight about its traffic profile, such triggers for renegotiation can be pre-determined and itemised in time so that the interface between the client and the network can automatically trigger the action when the conditions are met.

The renegotiation triggers can be represented for a single client-network interface as a set of time-based rules, as shown in FIG. 7.

The illustrated rule set indicates, for example, that at 8 AM, any traffic addressed to destination D1 with a traffic profile of A (e.g. DSCP value) should be renegotiated to a QoS model that offers a jitter of J1, loss of L1, delay of D1 and a high resilience of R1. This might cover peak traffic characteristics. At 5 PM, all traffic to destinations D1, D2 and D3 are to be renegotiated to a QoS profile {L2, D2, R2, C1, E1} where R2 can be a lower resilience value, C1 can be an upper bound on cost and E1 represents a band of operation for energy consumption. At 10 PM, for all destinations, the primary concern for the client is energy consumption and the client would therefore like a band of operation E2 which results in a lower energy consumption than band E1. This could denote that the client expects less traffic at night or that all traffic transmitted at night is chosen such that the overall cost for transmission is minimised.

Furthermore, any number of conditions can be added and verified. Alternatively, the traffic profile can specify a threshold in throughput which means that only traffic that is above a certain throughput will be renegotiated.

Note also that the QoS_D object (representing desired QoS) used as the basis for renegotiation need not be predetermined as shown in FIG. 7 and instead may be determined dynamically by a learning algorithm. Entries in the table can be added and removed dynamically based on traffic demand forecasts.

Time restrictions are also optional for some types of high-priority traffic and also if traffic is not expected to change over time. This is shown as an example in the last line of FIG. 7. Note that a traffic profile may be used not only to specify the DSCP value but also to characterise a minimum acceptable performance for the group of sessions. In the absence of a time restriction, renegotiation will be triggered whenever the conditions are met. This is an embodiment of performance-driven renegotiation—the rule set in FIG. 7 can be used to represent both contexts for client-driven renegotiation and using such a table, both performance- and traffic-driven renegotiation can be combined into one rule set.

System Architecture

Figure 8:
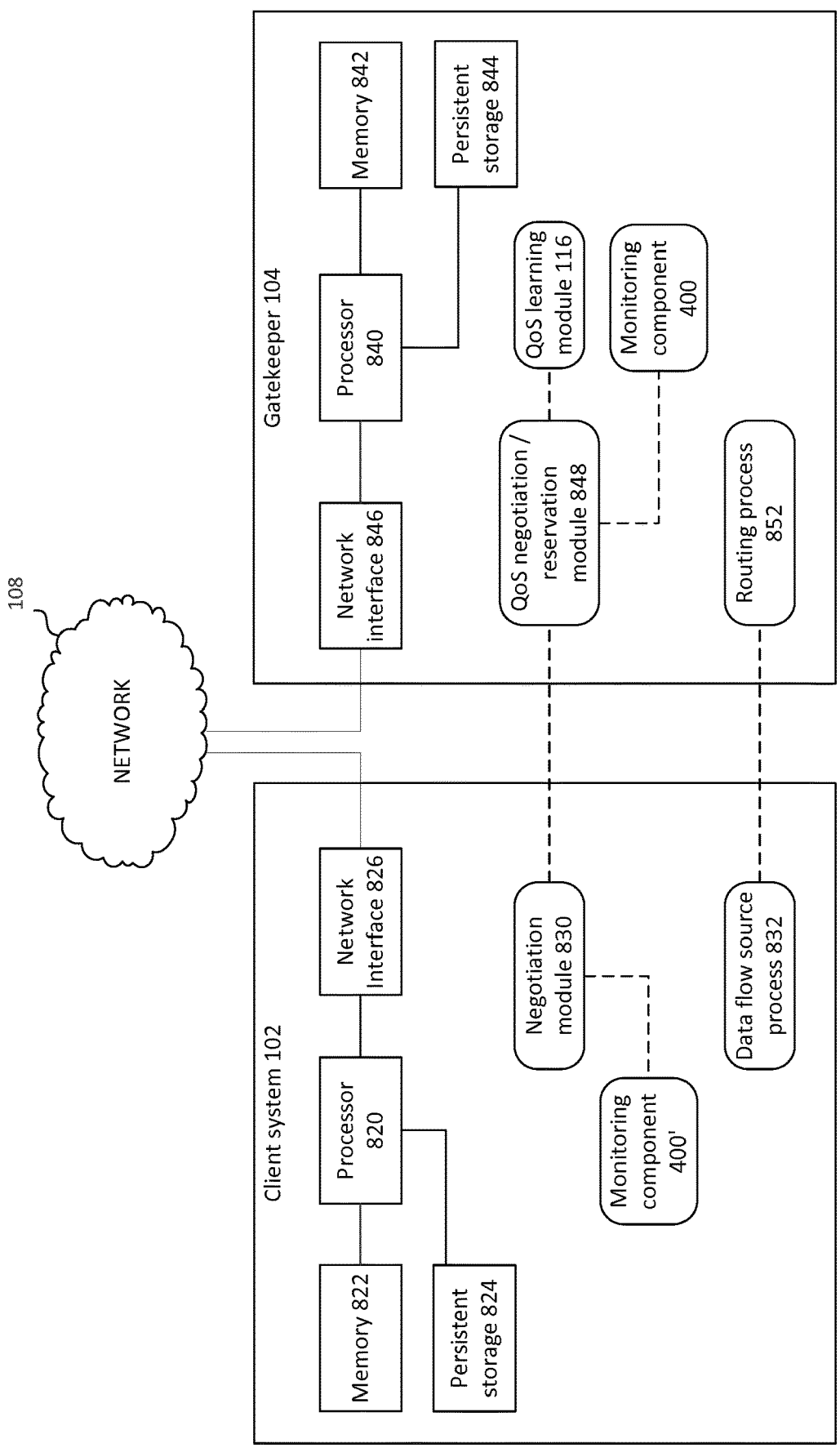
FIG. 8 illustrates hardware/software architectures for components of the system.

FIG. 8 illustrates by way of example a possible hardware and software architecture of the client and gatekeeper components of the system.

The client system 102 (e.g. a server originating a data flow that is to be transmitted across the network) includes one or more processors 820 together with volatile/random access memory 822 for storing temporary data and software code being executed. A network interface 826 is provided for communication with other system components (including gatekeeper 104) over one or more networks 108 (e.g. Local or Wide Area Networks, including the Internet).

Persistent storage 824 (e.g. in the form of hard disk storage, optical storage, solid state storage and the like) persistently stores software for implementing the methods described previously, including a negotiation module 830 for participating in the QoS negotiation process and a data flow source process 832 for generating and/or forwarding the data flow that is to be subject to the negotiated QoS. The persistent storage also includes other typical server software and data (not shown), such as a server operating system.

The client system 102 may include other conventional hardware components as known to those skilled in the art (e.g. I/O devices), and the components are interconnected by a data bus (this may in practice consist of several distinct buses such as a memory bus and I/O bus).

The Gatekeeper 104 may comprise conventional server hardware, including memory 842 and persistent storage media 844 (e.g. magnetic/optical/solid state disk storage), both for storing computer-executable software code and data, one or more processors 840 for executing software and a network interface 846 for communication with external networks 108.

The processor runs software modules including the QoS learning module 116 which implements the learning algorithms for dynamically discovering QoS models based on monitored data flow statistics, and creates a database of QoS models and model-to-route mappings for storage e.g. in memory 842 and/or persistent storage 844.

The processor 840 further runs a QoS negotiation/reservation module 848 for implementing the gatekeeper's negotiation and reservation functions, based on the QoS model information and route information stored in persistent storage 844 and/or memory 842. The negotiation module 848 communicates with the corresponding module 830 at client system 102 via the network to implement the described negotiation protocol.

In the case that the gatekeeper additionally performs traffic forwarding, the gatekeeper may also run routing process 852 for routing traffic tagged with a given negotiated QoS that is received from the client system (in particular data flow source process 832) onto assigned routes and performing load balancing and the like. Alternatively, traffic routing based on the negotiated QoS could be performed at external routing devices (e.g. the edge routers of FIG. 1).

The gatekeeper 104 further includes the monitoring component 400, which monitors existing data flows and checks whether any defined renegotiation conditions are met (e.g. based on performance, change of available QoS models etc. as described previously). If the monitoring component detects a renegotiation trigger condition, it initiates QoS renegotiation for the data flow, e.g. by interaction with the QoS negotiation/reservation module 848. A corresponding monitoring component 400' can also be provided in client system 102 to trigger client-side renegotiation, if required.

The persistent storage 844 also includes other typical server software and data (not shown), such as a server operating system. The gatekeeper 104 may include other conventional hardware components, with components interconnected via a bus, as described for client system 102. Note that where the gatekeeper implements routing functions, other conventional router software and hardware may be included, such as a set of interconnected line interface cards and a router operating system.

While a specific architecture is shown by way of example, any appropriate hardware/software architecture may be employed for components 102 and 104.

Furthermore, functional components indicated as separate may be combined and vice versa. For example, while negotiation module 830 and data flow source process 832 are shown as implemented in a single system 102, in practice these functions could be separated, for example with the client system 102 performing the negotiation on behalf of another system or device that originates and transmits the data flow (such as a media server in a media streaming application). Similarly, with regard to the gatekeeper 104, the QoS learning module 116 and/or monitoring component 400 may be implemented in one more physically separate devices from the QoS negotiation module 848. More generally, the functions of components 102 and 104 may in practice be distributed across any number of separate computing devices in any appropriate fashion.

The various methods and software elements described throughout this description are preferably provided in the form of computer-executable software code embodied in one or more tangible computer-readable storage media that may be executed by client system 102, gatekeeper 104, or any other appropriate devices.

It will be understood that the present invention has been described above purely by way of example, and modification of detail can be made within the scope of the invention.

The invention claimed is:

1. A method of transmitting a data flow via a network, the network supporting transmission of data in accordance with a plurality of dynamically identified Quality of Service, QoS, models, the method comprising:
    monitoring performance characteristics of the network to dynamically identify QoS models that the network can support, wherein each QoS model defines a Class of Service (CoS) that may be applied to traffic transported on the network;
    prior to transmission of the data flow, communicating with a client system associated with the data flow to configure a first class of service for the data flow based on a first QOS model;
    transmitting a first portion of the data flow through the network in accordance with the first class of service;
    determining one or more performance characteristics of the data flow;
    detecting a renegotiation condition, the renegotiation condition being detected when the determined performance characteristics differ from current performance requirements by more than a threshold difference;
    in response to detecting the renegotiation condition;
        communicating with the client system to configure a second class of service for the data flow based on a second QoS model selected from a set of currently available QoS models; and
        transmitting a subsequent portion of the data flow through the network in accordance with the second class of service; and
    tagging traffic of the data flow with a class of service identifier corresponding to the first and/or second configured class of service.

2. A method according to claim 1, wherein communicating to configure a second class of service comprises:
    transmitting a renegotiation notification to the client;
    receiving a response from the client, the response indicating the second QoS model for the data flow.

3. A method according to claim 2, comprising transmitting information specifying one or mom alternative QoS models for the data flow in the renegotiation notification.

4. A method according to claim 1, comprising transmitting information specifying one or more alternative QoS models for the data flow.

5. A method according to claim 4, wherein information specifying one or more alternative QoS models is sent in response to a query from the client system.

6. A method according to claim 4, wherein the second QOS model is selected from, or based on at least one of, the alternative QoS models.

7. A method according claim 1, wherein the determining of the performance characteristics of the data flow comprises one or both of:
    measuring one or more past performance characteristics of the data flow; and
    forecasting one or more future performance characteristics for the data flow.

8. A method according to claim 1, further comprising:
    selecting one or more reference data flows; and
    determining reference performance characteristics including determining characteristics representative of performance of the reference data flows.

9. A non-transitory computer readable medium comprising software code adapted, when executed on a data processing apparatus, to perform a method as set out in claim 1.

10. A method of transmitting a data flow via a network, the network supporting transmission of data in accordance with a plurality of dynamically identified Quality of Service, QoS, models, the method comprising:
    monitoring performance characteristics of the network to dynamically identify QoS models that the network can support, wherein each QoS model defines a Class of Service (CoS) that may be applied to traffic transported on the network;
    prior to transmission of the data flow, communicating with a client system associated with the data flow to configure a first class of service for the data flow based on a first QoS model;
    transmitting a first portion of the data flow through the network in accordance with the first class of service;
    determining one or more performance characteristics of the data flow;
    detecting a renegotiation condition, the renegotiation condition being detected when the determined performance characteristics differ from current performance requirements by more than a threshold difference;
    in response to detecting the renegotiation condition:
        communicating with the client system to configure a second class of service for the data flow based on a second QoS model selected from a set of currently available QoS models; and
        transmitting a subsequent portion of the data flow through the network in accordance with the second class of service;
    wherein the renegotiation condition relates to a change in an available set of QoS models;
    determining a requested QoS vector, wherein the requested QoS vector comprises a set of QoS metrics based on QoS requirements specified by the client system when configuring the first class of service;
    determining a delivered QoS vector, wherein the delivered QoS vector comprises a set of QoS metrics based on the first QoS model and/or a based on a measured or forecast performance of the data flow;
    determining a plurality of available QoS vectors for a set of available QoS models;
    computing a first difference measure between the requested QoS vector and the delivered QoS vector;
    computing respective second difference measures between the requested QoS vector and each of the available QoS vectors;
    identifying one or more available QoS models in the set of available QoS models having QoS vectors closer to the requested QoS vector than the delivered QoS vector in accordance with the computed difference measures; and in response to identifying one or more available QoS models, detecting the renegotiation condition and/or offering one or more of the identified available QoS models to the client for the data flow.

11. A method of transmitting a data flow via a network, the network supporting transmission of data in accordance with a plurality of Quality of Service, QoS, models, the method comprising:
  prior to transmission of the data flow, communicating with a client system associated with the data flow to configure a first class of service for the data flow based on a first QoS model;
  transmitting a first portion of the data flow through the network in accordance with the first class of service;
  detecting a renegotiation condition; and
  in response to detecting the renegotiation condition:
    communicating with the client system to configure a second class of service for the data flow based on a second QoS model; and
    transmitting a subsequent portion of the data flow through the network in accordance with the second class of service;
  wherein the renegotiation condition relates to a change in an available set of QoS models supported by the network, the change having occurred after configuration of the first class of service;
  wherein the method further comprises:
  determining a requested QoS vector, wherein the requested QoS vector comprises a set of QoS metrics based on QoS requirements specified by the client system when configuring the first class of service;
  determining a delivered QoS vector, wherein the delivered QoS vector comprises a set of QoS metrics based on the first QoS model and/or a based on a measured or forecast performance of the data flow;
  determining a plurality of available QoS vectors for a set of available QoS models;
  computing a first difference measure between the requested QoS vector and the delivered QoS vector;
  computing respective second difference measures between the requested QoS vector and each of the available QoS vectors;
  identifying one or more available QoS models in the set of available QoS models having QoS vectors closer to the requested QoS vector than the delivered QoS vector in accordance with the computed difference measures; and
  in response to identifying one or more available QoS models, detecting the renegotiation condition and/or offering one or more of the identified available QoS models to the client for the data flow.

\* \* \* \* \*